United States Patent
Sezginer et al.

(10) Patent No.: US 12,524,867 B2
(45) Date of Patent: Jan. 13, 2026

(54) SYSTEM AND METHOD FOR OPTICAL WAFER CHARACTERIZATION WITH IMAGE UP-SAMPLING

(71) Applicant: KLA Corporation, Milpitas, CA (US)

(72) Inventors: Abdurrahman Sezginer, Monte Sereno, CA (US); Wei Zhao, Breda (NL); Richard Wallingford, San Jose, CA (US); Grace Hsiu-Ling Chen, Los Gatos, CA (US); Xuzhao Liu, Milpitas, CA (US); Ge Cong, Pleasanton, CA (US); Leon Yu, Milpitas, CA (US); Kuljit Virk, Fremont, CA (US); Bosheng Zhang, Milpitas, CA (US); Amrish Patel, Milpitas, CA (US); Patrick McBride, Davis, CA (US)

(73) Assignee: KLA Corporation, Milpitas, CA (US)

( * ) Notice: Subject to any disclaimer, the term of this patent is extended or adjusted under 35 U.S.C. 154(b) by 262 days.

(21) Appl. No.: 17/492,321

(22) Filed: Oct. 1, 2021

(65) Prior Publication Data
US 2022/0383470 A1  Dec. 1, 2022

Related U.S. Application Data

(60) Provisional application No. 63/191,845, filed on May 21, 2021.

(51) Int. Cl.
*G06T 7/00* (2017.01)
*H01L 21/66* (2006.01)

(52) U.S. Cl.
CPC .............. *G06T 7/001* (2013.01); *H01L 22/12* (2013.01); *G06T 2207/20056* (2013.01); *G06T 2207/20182* (2013.01); *G06T 2207/30148* (2013.01)

(58) Field of Classification Search
CPC . G06T 7/00; G06T 7/001; G06T 2207/20056; G06T 2207/20182;
(Continued)

(56) References Cited

U.S. PATENT DOCUMENTS

| | | | |
|---|---|---|---|
| 5,801,965 A | 9/1998 | Takagi et al. | |
| 5,864,394 A * | 1/1999 | Jordan, III | G01R 31/308 356/394 |

(Continued)

FOREIGN PATENT DOCUMENTS

| | | | | |
|---|---|---|---|---|
| KR | 20140140028 A * | 12/2014 | | A61B 5/725 |
| KR | 101556430 B1 * | 10/2015 | | G01N 21/9501 |

(Continued)

OTHER PUBLICATIONS

J. Astola and L. Yaroslavsky, Advances in Signal Transforms: Theory and Applications, Hindawi , 2007, 425 pages.
(Continued)

*Primary Examiner* — Stephen R Koziol
*Assistant Examiner* — Benedict E Lee
(74) *Attorney, Agent, or Firm* — Suiter Swantz IP

(57) ABSTRACT

A system includes a processing unit communicatively coupled to a detector array of an optical wafer characterization system. The processing unit is configured to perform one or more steps of a method or process including the steps of acquiring one or more target images of a target location on a wafer from the detector array, applying a de-noising filter to at least the one or more target images, determining one or more difference images from one or more reference images and the one or more target images, and up-sampling the one or more difference images to generate one or more up-sampled images. One or more wafer defects are detectable in the one or more difference images or the up-sampled images.

66 Claims, 17 Drawing Sheets

(58) Field of Classification Search
CPC . G06T 2207/30148; G06T 5/002; G06T 5/10;
G06T 2207/10056; G06T 2207/20224;
H01L 21/66; H01L 22/12; H04N 23/70;
H04N 23/80; H04N 23/81; H04N 25/60;
H04N 25/61; H04N 25/62; H04N 25/63;
H04N 25/64; H04N 25/65; H04N 25/66;
H04N 25/67; H04N 25/68; H04N 5/253
See application file for complete search history.

(56) References Cited

U.S. PATENT DOCUMENTS

| | | | |
|---|---|---|---|
| 6,200,823 B1 | 3/2001 | Steffan et al. | |
| 7,440,608 B2 * | 10/2008 | Silverstein | H04N 5/253 |
| | | | 348/E5.049 |
| 7,483,196 B2 | 1/2009 | Allen et al. | |
| 8,175,831 B2 | 5/2012 | Zikson et al. | |
| 8,611,639 B2 | 12/2013 | Kulkarni et al. | |
| 8,774,544 B1 * | 7/2014 | Szedo | G06T 5/70 |
| | | | 382/260 |
| 8,775,101 B2 * | 7/2014 | Huang | G01N 21/9501 |
| | | | 702/40 |
| 8,811,712 B2 * | 8/2014 | Maeda | G06T 7/001 |
| | | | 382/141 |
| 8,947,521 B1 | 2/2015 | Hill et al. | |
| 8,977,035 B2 | 3/2015 | Dalla-Torre et al. | |
| 9,049,390 B2 * | 6/2015 | Venkataraman | G06T 7/557 |
| 9,626,749 B2 * | 4/2017 | Golembiowski | G06T 5/20 |
| 9,651,943 B2 | 5/2017 | Izikson et al. | |
| 9,734,422 B2 * | 8/2017 | Kolchin | G06T 5/70 |
| 10,211,025 B2 * | 2/2019 | Lee | G06T 7/74 |
| 10,267,745 B2 * | 4/2019 | Otani | G01N 21/8806 |
| 10,360,477 B2 | 7/2019 | Bhaskar et al. | |
| 10,620,135 B2 * | 4/2020 | Brauer | G06T 7/0006 |
| 10,648,924 B2 | 5/2020 | Zhang et al. | |
| 11,156,821 B2 * | 10/2021 | Chen | G02B 21/367 |
| 11,340,437 B2 * | 5/2022 | Langlois | G02B 27/60 |
| 11,394,880 B2 * | 7/2022 | Han | H04N 23/81 |
| 11,457,160 B2 * | 9/2022 | Seok | H04N 23/11 |
| 2011/0274342 A1 | 11/2011 | Maeda et al. | |
| 2013/0035876 A1 | 2/2013 | Huang et al. | |
| 2017/0178295 A1 * | 6/2017 | Diggins | G06T 5/50 |
| 2019/0244513 A1 * | 8/2019 | Niculescu-Mizil | |
| | | | G06V 10/764 |
| 2020/0126199 A1 | 4/2020 | Lin | |
| 2021/0118110 A1 | 4/2021 | Langlois et al. | |
| 2022/0127947 A1 * | 4/2022 | Machocki | E21B 44/02 |

FOREIGN PATENT DOCUMENTS

| | | |
|---|---|---|
| KR | 20200141524 A | 12/2020 |
| TW | 202117576 A | 5/2021 |

OTHER PUBLICATIONS

International Search Report and Written Opinion in European Application No. PCT/US2022/028648 dated Aug. 26, 2022, 12 pages.

Taiwan Patent Office, Office Action received in TW Application No. 111113876, Jun. 27, 2025, 107 pages (including translation).

* cited by examiner

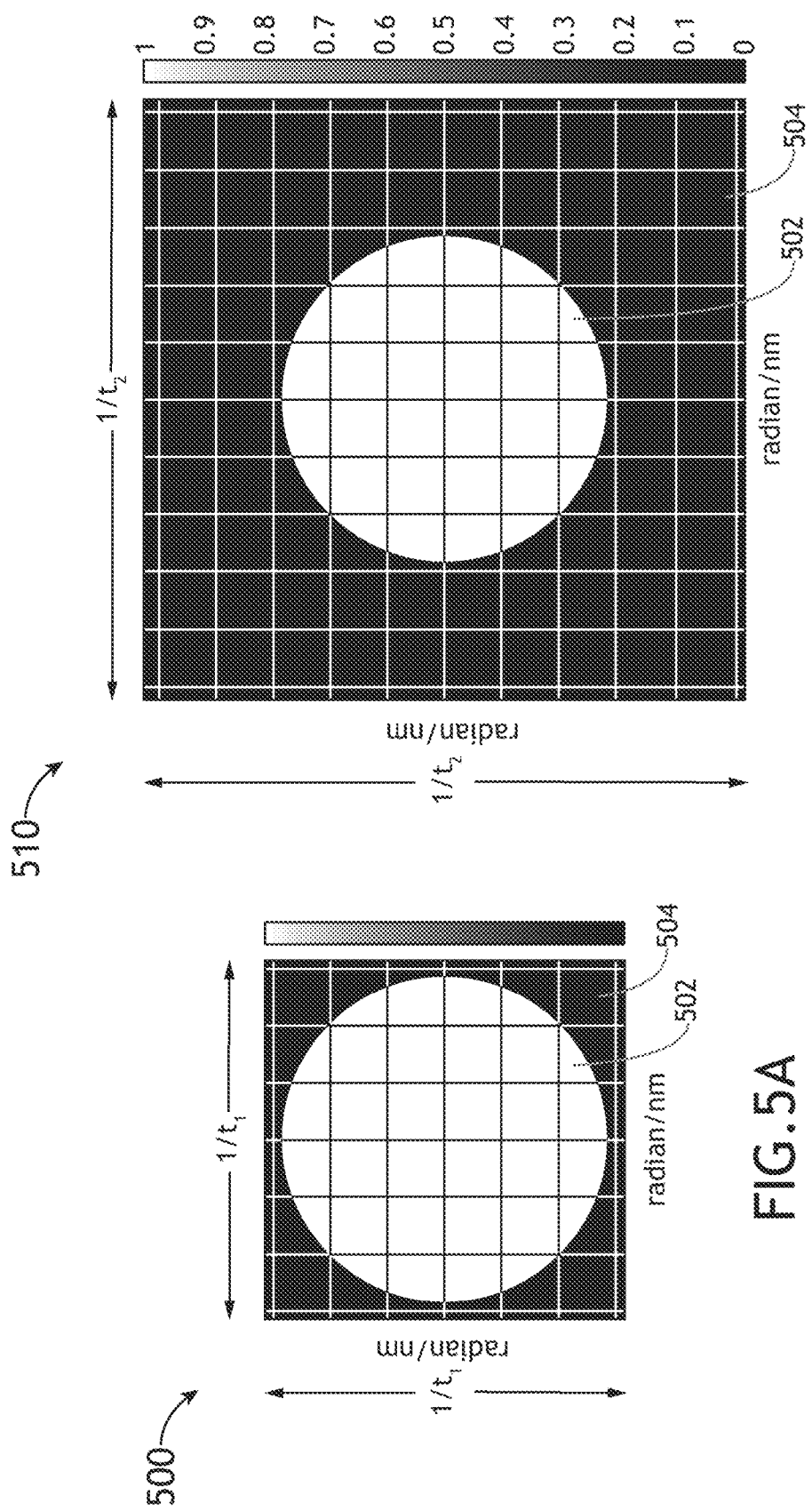

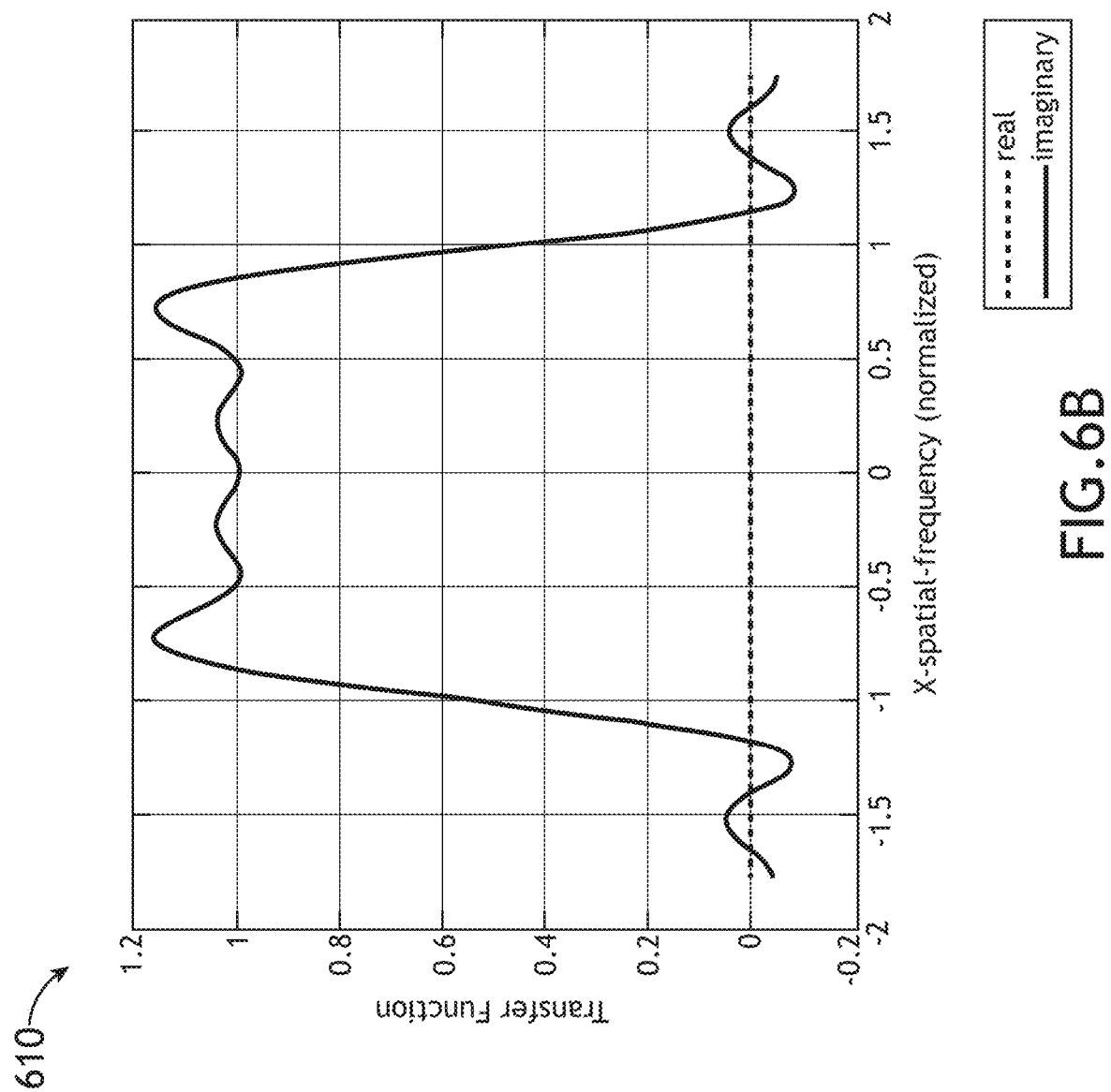

SYSTEM AND METHOD FOR OPTICAL WAFER CHARACTERIZATION WITH IMAGE UP-SAMPLING

CROSS-REFERENCE TO RELATED APPLICATION

The present application claims the benefit of U.S. Provisional Application Ser. No. 63/191,845, filed on May 21, 2021, which is incorporated herein by reference in the entirety.

TECHNICAL FIELD

The present invention generally relates to specimen characterization and inspection and, more particularly, to a system and method for optical wafer characterization with image up-sampling.

BACKGROUND

Demand for electronic logic and memory devices with ever-smaller footprints and features present a wide range of manufacturing challenges beyond fabrication at a desired scale. For example, in broadband plasma (BBP) wafer inspection, smaller pixels may provide higher sensitivity at the expense of throughput, resulting in the need for a compromise between sensitivity and throughput. By way of another example, BBP wafer inspection may include obtaining a difference image by subtracting grey levels of a target image and of a reference image, to which a filter may be applied in a limited capacity to increase the signal-to-noise ratio (SMR) of defects of interest. By way of another example, depending on the type and/or the amount of sampling in the inspection modes being employed during BBP wafer inspection, aliasing noise may be introduced to images.

Therefore, it would be desirable to provide a system and method that cure the shortfalls of the previous approaches identified above.

SUMMARY

A system is disclosed, in accordance with one or more embodiments of the present disclosure. In one illustrative embodiment, the system includes a processing unit communicatively coupled to a detector array of an optical wafer characterization system. In another illustrative embodiment, the processing unit is configured to acquire one or more target images of a target location on a wafer from the detector array. In another illustrative embodiment, the processing unit is configured to determine one or more difference images from one or more reference images and the one or more target images. In another illustrative embodiment, the processing unit is configured to up-sample the one or more difference images to generate one or more up-sampled images. In another illustrative embodiment, one or more wafer defects are detectable in the one or more up-sampled images.

A method is disclosed, in accordance with one or more embodiments of the present disclosure. In one illustrative embodiment, the method may include, but is not limited to, acquiring, via a processing unit, one or more target images of a target location on a wafer from a detector array of an optical wafer characterization system. In another illustrative embodiment, the method may include, but is not limited to, determining, via the processing unit, one or more difference images from one or more reference images and the one or more target images. In another illustrative embodiment, the method may include, but is not limited to, up-sampling, via the processing unit, the one or more difference images to generate one or more up-sampled images. In another illustrative embodiment, one or more wafer defects are detectable in the one or more up-sampled images.

An optical wafer characterization system is disclosed, in accordance with one or more embodiments of the present disclosure. In one illustrative embodiment, the optical wafer characterization system includes a light source configured to generate and transmit light. In another illustrative embodiment, the optical wafer characterization system includes an illumination arm with one or more illumination optics configured to illuminate a wafer disposed on a stage assembly with light received from the light source. In another illustrative embodiment, the optical wafer characterization system includes a collection arm with one or more collection optics. In another illustrative embodiment, the optical wafer characterization system includes a detector array including one or more sensors. In another illustrative embodiment, the one or more collection optics are configured to image the wafer onto the detector array. In another illustrative embodiment, the optical wafer characterization system includes a processing unit communicatively coupled to the detector array. In another illustrative embodiment, the processing unit is configured to acquire one or more target images of a target location on the wafer from the detector array. In another illustrative embodiment, the processing unit is configured to determine one or more difference images from one or more reference images and the one or more target images. In another illustrative embodiment, the processing unit is configured to up-sample the one or more difference images to generate one or more up-sampled images. In another illustrative embodiment, one or more wafer defects are detectable in the one or more up-sampled images.

A system is disclosed, in accordance with one or more embodiments of the present disclosure. In one illustrative embodiment, the system includes a processing unit communicatively coupled to a detector array of an optical wafer characterization system. In another illustrative embodiment, the processing unit is configured to acquire one or more target images of a target location on a wafer from the detector array. In another illustrative embodiment, the processing unit is configured to apply a de-noising filter to at least the one or more target images. In another illustrative embodiment, the processing unit is configured to determine one or more difference images from one or more reference images and the one or more target images after de-noising at least the one or more target images. In another illustrative embodiment, one or more wafer defects are detectable in the one or more difference images.

A method is disclosed, in accordance with one or more embodiments of the present disclosure. In one illustrative embodiment, the method may include, but is not limited to, acquiring, via a processing unit, one or more target images of a target location on a wafer from a detector array of an optical wafer characterization system. In another illustrative embodiment, the method may include, but is not limited to, applying, via the processing unit, a de-noising filter to at least the one or more target images. In another illustrative embodiment, the method may include, but is not limited to, determining, via the processing unit, one or more difference images from one or more reference images and the one or more target images after de-noising at least the one or more target images. In another illustrative embodiment, one or more wafer defects are detectable in the one or more difference images.

An optical wafer characterization system is disclosed, in accordance with one or more embodiments of the present disclosure. In one illustrative embodiment, the optical wafer characterization system includes a light source configured to generate and transmit light. In another illustrative embodiment, the optical wafer characterization system includes an illumination arm with one or more illumination optics configured to illuminate a wafer disposed on a stage assembly with light received from the light source. In another illustrative embodiment, the optical wafer characterization system includes a collection arm with one or more collection optics. In another illustrative embodiment, the optical wafer characterization system includes a detector array including one or more sensors. In another illustrative embodiment, the one or more collection optics are configured to image the wafer onto the detector array. In another illustrative embodiment, the optical wafer characterization system includes a processing unit communicatively coupled to the detector array. In another illustrative embodiment, the processing unit is configured to acquire one or more target images of a target location on the wafer from the detector array. In another illustrative embodiment, the processing unit is configured to apply a de-noising filter to at least the one or more target images. In another illustrative embodiment, the processing unit is configured to determine one or more difference images from one or more reference images and the one or more target images after de-noising at least the one or more target images. In another illustrative embodiment, one or more wafer defects are detectable in the one or more difference images.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which:

FIG. 5A is a graph illustrating a separation of optical information from noise, in accordance with one or more embodiments of the present disclosure;

FIG. 5B is a graph illustrating a separation of optical information from noise, in accordance with one or more embodiments of the present disclosure;

FIG. 6B is a graph comparing a transfer function of a FIR filter via an x-spatial normalized frequency, in accordance with one or more embodiments of the present disclosure;

DETAILED DESCRIPTION

Figure 1:
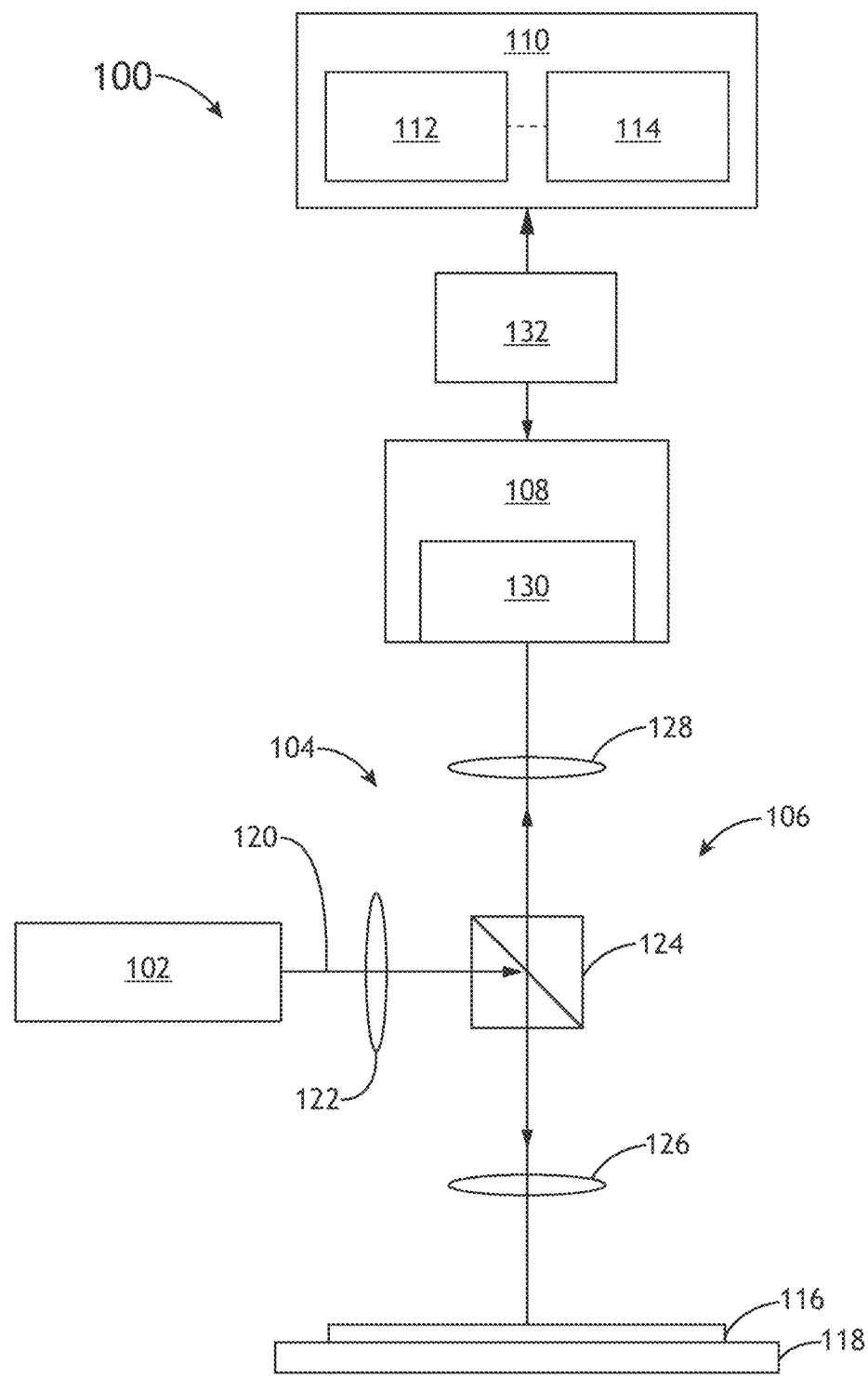
FIG. 1 illustrates a simplified block diagram of a system for optical wafer characterization with image up-sampling, in accordance with one or more embodiments of the present disclosure.

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Reference will now be made in detail to the subject matter disclosed, which is illustrated in the accompanying drawings.

Demand for electronic logic and memory devices with ever-smaller footprints and features present a wide range of manufacturing challenges beyond fabrication at a desired scale.

For example, in broadband plasma (BBP) wafer inspection, smaller pixels may provide higher sensitivity at the expense of throughput (e.g., high sensitivity, but low throughput), while larger pixels may provide higher throughput at the expense of sensitivity (e.g., high throughput, low sensitivity), resulting in the need for a compromise between sensitivity and throughput.

By way of another example, BBP wafer inspection may include obtaining a difference image by subtracting grey levels of a target image and of a reference image, to which a filter may be applied in a limited capacity to increase the signal-to-noise ratio (SMR) of defects of interest. It is noted herein "a filter being applied to the difference image" may be understood as a two-dimensional kernel being convolved as a square the size of the detector pixel with the image, for purposes of the present disclosure.

In this example, the filter, a "diff-filter" or "dif-filter", may be applied only to difference images, and cannot be applied to target and reference images as doing so may greatly alter images and may degrade image alignment algorithms. In this regard, target and reference images may not benefit from the diff-filter/dif-filter, despite noise in target and reference images potentially affecting the performance of wafer inspection by affecting the 2-dimensional (2D) detection algorithm (e.g., a multi-die automatic threshold (MDAT) algorithm, or the like), attributes used in the Nuisance Event Filter (NEF) during BBP inspection, or the like. In addition, the diff-filter/dif-filter may be applied in a central processing unit (CPU) of an imaging computer in a BBP inspection system, which may limit the largest filter that may be used without degrading the throughput of the imaging computer.

By way of another example, depending on the type and/or the amount of sampling in the inspection modes being employed during BBP wafer inspection, aliasing noise may be introduced to images.

Referring now to FIGS. 1A-15, a system and method for optical wafer characterization with image up-sampling are described, in accordance with one or more embodiments of the present disclosure.

Embodiments are directed to a system and method for optical wafer characterization with image up-sampling. Embodiments of the present disclosure are also directed to improving a trade-off between throughput and sensitivity, by using a large pixel with up-sampling to create an equivalent small-pixel sensitivity. Embodiments of the present disclosure are also directed to a spatial frequency filter or band limiting filter (BLF) usable to increase the signal-to-noise ratio (SNR) of optical images captured by a detector. Embodiments of the present disclosure are directed to anti-aliasing techniques.

Figure 2:
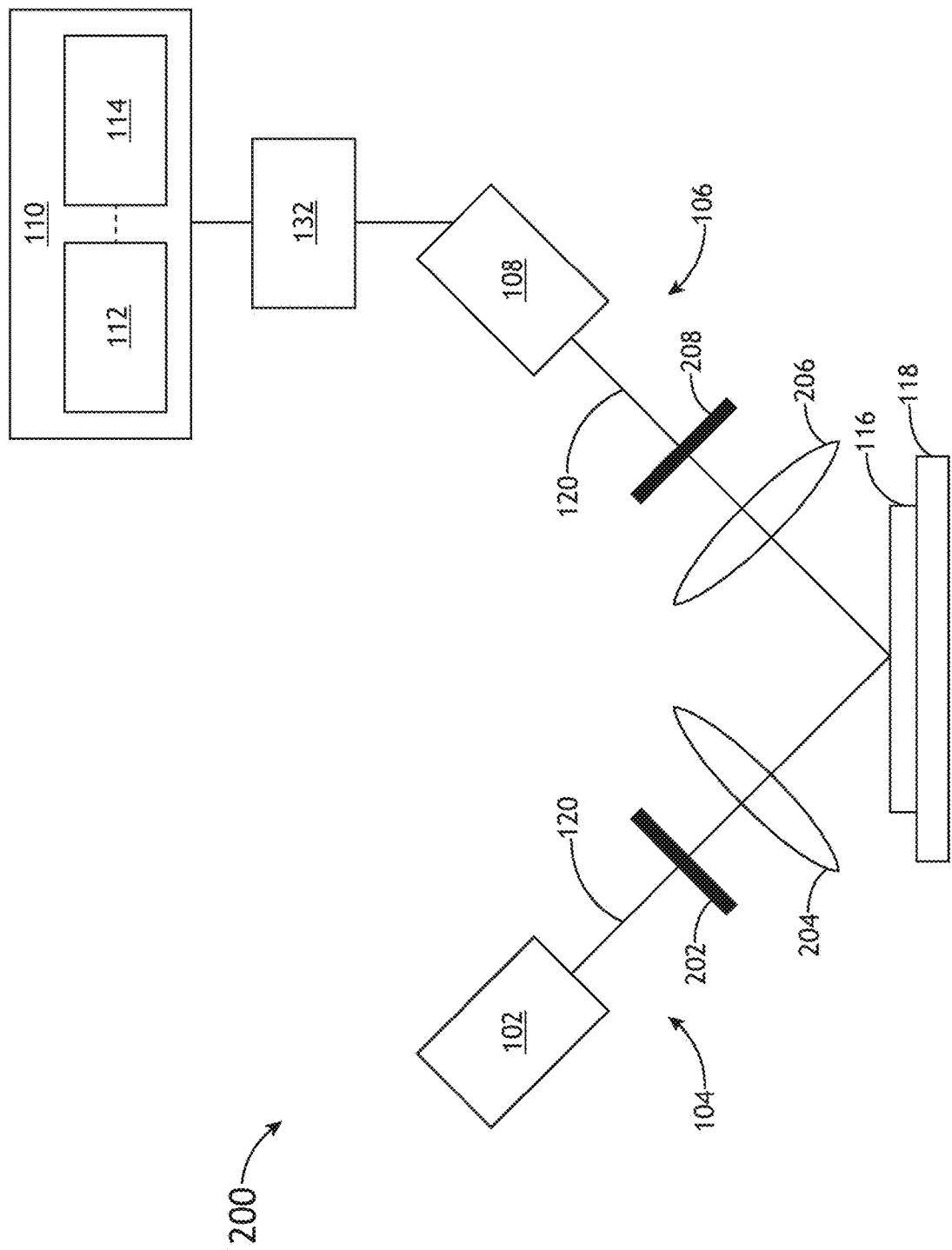
FIG. 2 illustrates a simplified schematic view of a system for optical wafer characterization with image up-sampling, in accordance with one or more embodiments of the present disclosure.

FIG. 1 illustrates an optical wafer characterization system 100 and FIG. 2 illustrates an optical wafer characterization system 200, in accordance with one or more embodiments of the present disclosure. In general, the system 100 and/or the system 200 may comprise any characterization system known in the art including, but not limited to, an inspection or metrology system. For example, the system 100 and/or the system 200 may include a broadband plasma (BBP) optical inspection system. In this regard, the system 100 and/or the system 200 may be configured to perform inspection or optical metrology on a sample. It is noted herein, however, the above description should not be interpreted as a limitation on the present disclosure but merely an illustration. It is noted that the various embodiments and components described with respect to the system 100 of FIG. 1 may be interpreted to extend to the system 200 of FIG. 2, and vice versa.

In embodiments, the system 100 includes a light source 102 configured to generate and transmit light, an illumination arm 104 configured to receive light, a collection arm 106 configured to direct light to a detector array 108, and a controller 110 including one or more processors 112 and memory 114. For example, the light source 102 may include, but is not limited to, a broadband plasma (BBP) light source. For instance, the light source 102 may include, but is not limited to, a laser-sustained plasma (LSP) radiation source 102.

As used throughout the present disclosure, the term "sample" generally refers to a substrate formed of a semiconductor or non-semiconductor material (e.g., a wafer, a reticle/photomask, or the like). For example, a semiconductor or non-semiconductor material may include, but is not limited to, monocrystalline silicon, gallium arsenide, and indium phosphide. A sample may include one or more layers. For example, such layers may include, but are not limited to, a resist, a dielectric material, a conductive material, and a semiconductive material. Many different types of such layers are known in the art, and the term sample as used herein is intended to encompass a sample on which all types of such layers may be formed. One or more layers formed on a sample may be patterned or unpatterned. For example, a sample may include a plurality of dies, each having repeatable patterned features. By way of another example, each of the plurality of dies may include a plurality of fields. Formation and processing of such layers of material may ultimately result in completed devices. Many different types of devices may be formed on a sample, and the term sample as used herein is intended to encompass a sample on which any type of device known in the art is being fabricated. Further, for the purposes of the present disclosure, the term sample and wafer should be interpreted as interchangeable.

In embodiments, the sample 116 is disposed on a stage assembly 118 to facilitate movement of sample 116. The stage assembly 118 may include any stage assembly 118 known in the art including, but not limited to, an X-Y stage, an R-θ stage, or the like. In embodiments, the stage assembly 118 is capable of adjusting the height of sample 116 during inspection or imaging to maintain focus on the sample 116. In general, the stage assembly 118 may include, but is not limited to, one or more translational stages suitable for selectively translating the sample 116 along one or more linear directions (e.g., x-direction, y-direction and/or z-direction). In addition, the stage assembly 118 may include, but is not limited to, one or more rotational stages suitable for selectively rotating the sample 116 along a rotational direction. By way of another example, the stage assembly 118 may include, but is not limited to, a rotational stage and a translational stage suitable for selectively translating the sample 116 along a linear direction and/or rotating the sample 116 along a rotational direction.

In embodiments, the illumination arm 104 is configured to direct light 120 from the light source 102 to the sample 116. The illumination arm 104 may include any number and/or type of optical components known in the art. For example, the illumination arm 104 may include, but is not limited to, one or more optical elements 122, a beam splitter 124, and an objective lens 126. For instance, the one or more optical elements 122 may include any optical element or combination of optical elements known in the art including, but not limited to, one or more mirrors, one or more lenses, one or more polarizers, one or more gratings, one or more filters, one or more beam splitters, or the like. In this regard, the illumination arm 104 may be configured to focus light 120 from the light source 102 onto the surface of the sample 116.

In embodiments, the collection arm 106 is configured to collect light reflected, scattered, diffracted, and/or emitted from the sample 116. The collection arm 106 may include any number and/or type of optical components known in the art. For example, the collection arm 106 may include, but is not limited to, one or more optical elements 128. For instance, the one or more optical elements 128 may include any optical element or combination of optical elements known in the art including, but not limited to, one or more mirrors, one or more lenses, one or more polarizers, one or more gratings, one or more filters, one or more beam splitters, or the like.

In embodiments, the collection arm 106 is configured to direct and/or focus the light from the sample 116 to a sensor or detector 130 of the detector array 108. It is noted that the detector 130 and detector array 108 may include any sensor and detector assembly known in the art. The detector 130 may include, but is not limited to, a charge-coupled device (CCD) detector, a complementary metal-oxide semiconductor (CMOS) detector, a time-delay integration (TDI) detector, a photomultiplier tube (PMT), an avalanche photodiode (APD), or the like. Further, the detector 130 may include, but is not limited to, a line sensor or an electron-bombarded line sensor.

In embodiments, the detector array 108 is communicatively coupled to a processing unit 132. For example, the processing unit 132 may include, but is not limited to, a field programmable gate array (FPGA). By way of another example, the processing unit 132 may include, but is not limited to, an application-specific integrated circuit, a graphical processing unit (GPU), or a central processing unit (CPU). It is noted herein the processing unit 132 may include a single instance or a combination of the above examples.

In embodiments, the processing unit 132 is communicatively coupled to the controller 110 including the one or more processors 112 and memory 114. The one or more processors 112 may be communicatively coupled to memory 114, where the one or more processors 112 are configured to execute a set of program instructions stored on memory 114. It is noted herein, however, the processing unit 132 may be integrated into the controller 110, and not a standalone component. In addition, it is noted herein the detector array 108 may be communicatively coupled to the controller 110 including the one or more processors 112 and memory 114, such that the processing unit 132 is integrated into either the detector array 108 or the controller 110, or the processing unit 132 is not a component of the system 100 (e.g., where the controller 110 is configured to perform the functions of the processing unit 132).

In embodiments, the one or more processors 112 are configured to analyze the output of the detector array 108. In embodiments, the set of program instructions are configured to cause the one or more processors 112 to analyze one or more characteristics of the sample 116. In embodiments, the set of program instructions are configured to cause the one or more processors 112 to modify one or more characteristics of the system 100 in order to maintain focus on the sample 116 and/or the detector 130. For example, the one or more processors 112 may be configured to adjust the objective lens 126 or one or more optical elements 122 in order to focus the light 120 from the light source 102 onto the surface of the sample 116. By way of another example, the one or more processors 112 may be configured to adjust the objective lens 126 and/or one or more optical elements 128 in order to collect illumination from the surface of the sample 116 and focus the collected illumination on the detector 130.

It is noted the system 100 may be configured in any optical configuration known in the art including, but not limited to, a dark-field configuration, a bright-field orientation, or the like.

It is noted herein that the one or more components of system 100 may be communicatively coupled to the various other components of system 100 in any manner known in the art. For example, the light source 102, the detector array 108, the processing unit 132, the controller 110, and/or the one or more processors 112 may be communicatively coupled to each other and other components via a wireline (e.g., copper wire, fiber optic cable, or the like), wireless connection (e.g., RF coupling, IR coupling, WiMax, Bluetooth, 3G, 4G, 4G LTE, 5G, or the like).

In embodiments, the system 200 includes the light source 102, an illumination arm 104, a collection arm 106, a detector array 108, and the controller 110 including the one or more processors 112 and memory 114. The system 200 may be system 200 arranged in a reflectometry and/or ellipsometry configuration. It is noted herein the system 200 may include any type of metrology system known in the art.

In embodiments, the light 120 from the light source 102 is directed to the sample 116 via the illumination arm 104. In embodiments, the system 200 collects radiation emanating from the sample 116 via the collection arm 106. The illumination arm 104 may include one or more beam conditioning elements 202 suitable for modifying and/or conditioning the light 120. For example, the one or more beam conditioning elements 202 may include, but are not limited to, one or more polarizers, one or more filters, one or more beam splitters, one or more diffusers, one or more homogenizers, one or more apodizers, one or more beam shapers, or one or more lenses.

In embodiments, the illumination arm 104 may utilize a first focusing element 204 to focus and/or direct the light 120 onto the sample 116 disposed on the stage assembly 118. In embodiments, the collection arm 106 may include a second focusing element 206 to collect radiation from the sample 116. The collection arm 106 may further include one or more collection beam conditioning elements 208 to direct and/or modify illumination collected by the second focusing element 206. For example, the one or more collection beam conditioning elements 208 may include, but are not limited to, one or more lenses, one or more filters, one or more polarizers, or one or more phase plates.

In embodiments, the detector array 108 is configured to capture radiation emanating from the sample 116 through the collection arm 106. For example, the detector assembly or array 108 may receive radiation reflected or scattered (e.g., via specular reflection, diffuse reflection, or the like) from the sample 116. By way of another example, the detector array 108 may receive radiation generated by the sample 116 (e.g., luminescence associated with absorption of the light 120, or the like). It is noted that detector array 108 may include any sensor and detector assembly known in the art. The sensor may include, but is not limited to, a CCD detector, a CMOS detector, a TDI detector, a PMT, an APD, or the like.

The system 200 may be configured as any type of metrology tool known in the art such as, but not limited to, a spectroscopic ellipsometer with one or more angles of illumination, a spectroscopic ellipsometer for measuring Mueller matrix elements (e.g., using rotating compensators), a single-wavelength ellipsometer, an angle-resolved ellipsometer (e.g., a beam-profile ellipsometer), a spectroscopic reflectometer, a single-wavelength reflectometer, an angle-resolved reflectometer (e.g., a beam-profile reflectometer), an imaging system, a pupil imaging system, a spectral imaging system, or a scatterometer.

A description of an inspection/metrology tools suitable for implementation in the various embodiments of the present disclosure are provided in U.S. Published Patent Application 2009/0180176, entitled "Split Field Inspection System Using Small Catadioptric Objectives," published on Jul. 16, 2009; U.S. Published Patent Application 2007/0002465, entitled "Beam Delivery System for Laser Dark-Field Illumination in a Catadioptric Optical System," published on Jan. 4, 2007; U.S. Pat. No. 5,999,310, entitled "Ultra-broadband UV Microscope Imaging System with Wide Range Zoom Capability," issued on Dec. 7, 1999; U.S. Pat. No. 7,525,649 entitled "Surface Inspection System Using Laser Line Illumination with Two Dimensional Imaging," issued on Apr. 28, 2009; U.S. Published Patent Application 2013/0114085, entitled "Dynamically Adjustable Semiconductor Metrology System," by Wang et al. and published on May 9, 2013; U.S. Pat. No. 5,608,526, entitled "Focused Beam Spectroscopic Ellipsometry Method and System, by Piwonka-Corle et al., issued on Mar. 4, 1997; and U.S. Pat. No. 6,297,880, entitled "Apparatus for Analyzing Multi-Layer Thin Film Stacks on Semiconductors," by Rosencwaig et al., issued on Oct. 2, 2001, which are each incorporated herein by reference in their entirety.

In embodiments, the systems 100, 200 may be configured as a "stand alone tool," interpreted herein as a tool that is not physically coupled to a process tool. In other embodiments, such as an inspection or metrology system, the systems 100, 200 may be coupled to a process tool (not shown) by a transmission medium, which may include wired and/or wireless portions. For example, the process tool may include any process tool known in the art such as a lithography tool, an etch tool, a deposition tool, a polishing tool, a plating tool, a cleaning tool, an ion implantation tool, or the like. The results of inspection or measurement performed by the systems 100, 200 described herein may be used to alter a parameter of a process or a process tool using a feedback control technique, a feedforward control technique, and/or an in-situ control technique. The parameter of the process or the process tool may be altered manually or automatically.

The embodiments of the systems 100, 200 may be further configured as described herein. In addition, the systems 100, 200 may be configured to perform any other step(s) of any of the method embodiment(s) described herein.

Figure 3:
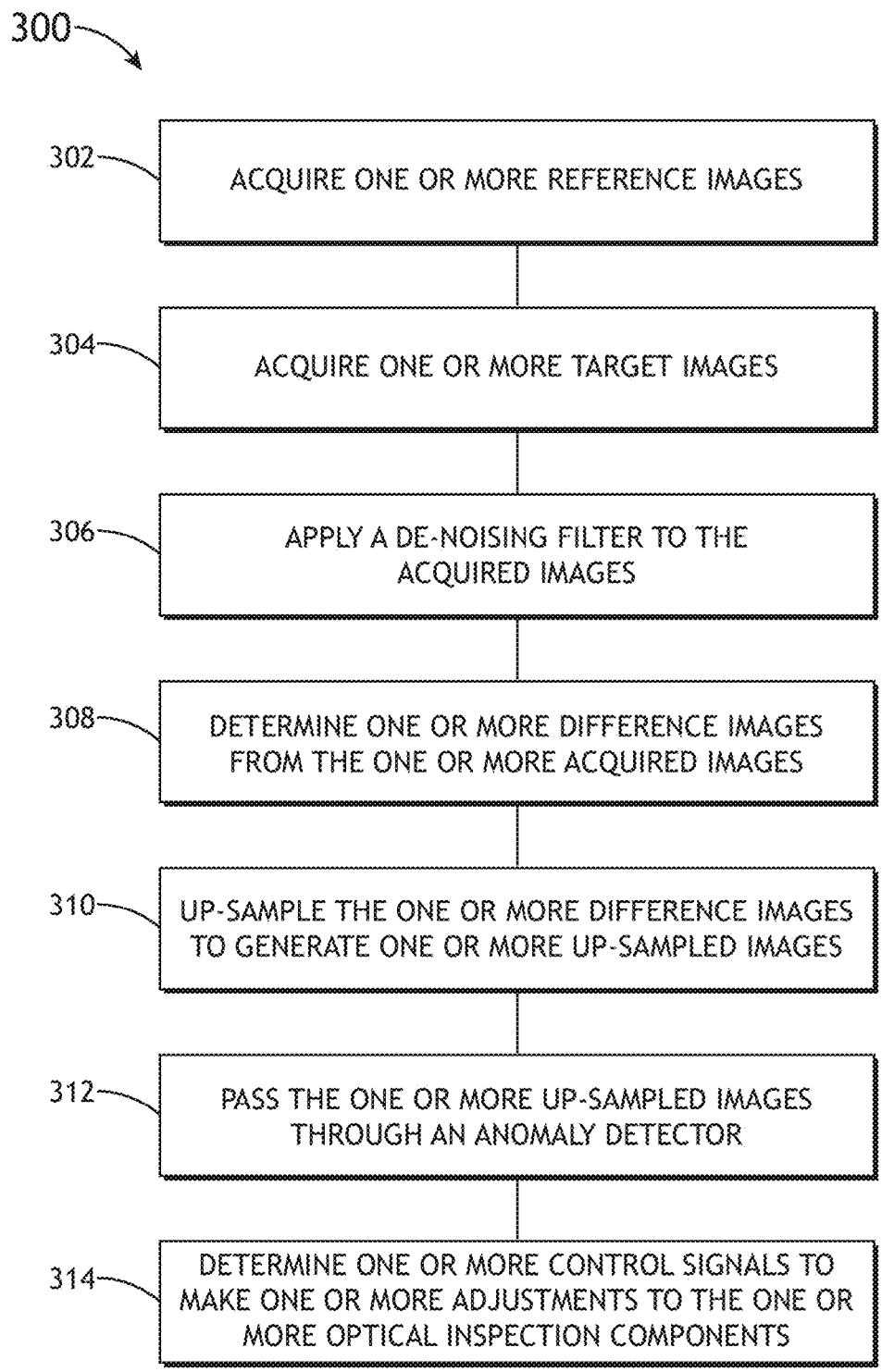
FIG. 3 is a flow diagram illustrating steps performed in a method for optical wafer characterization with image up-sampling, in accordance with one or more embodiments of the present disclosure.
Figure 4:
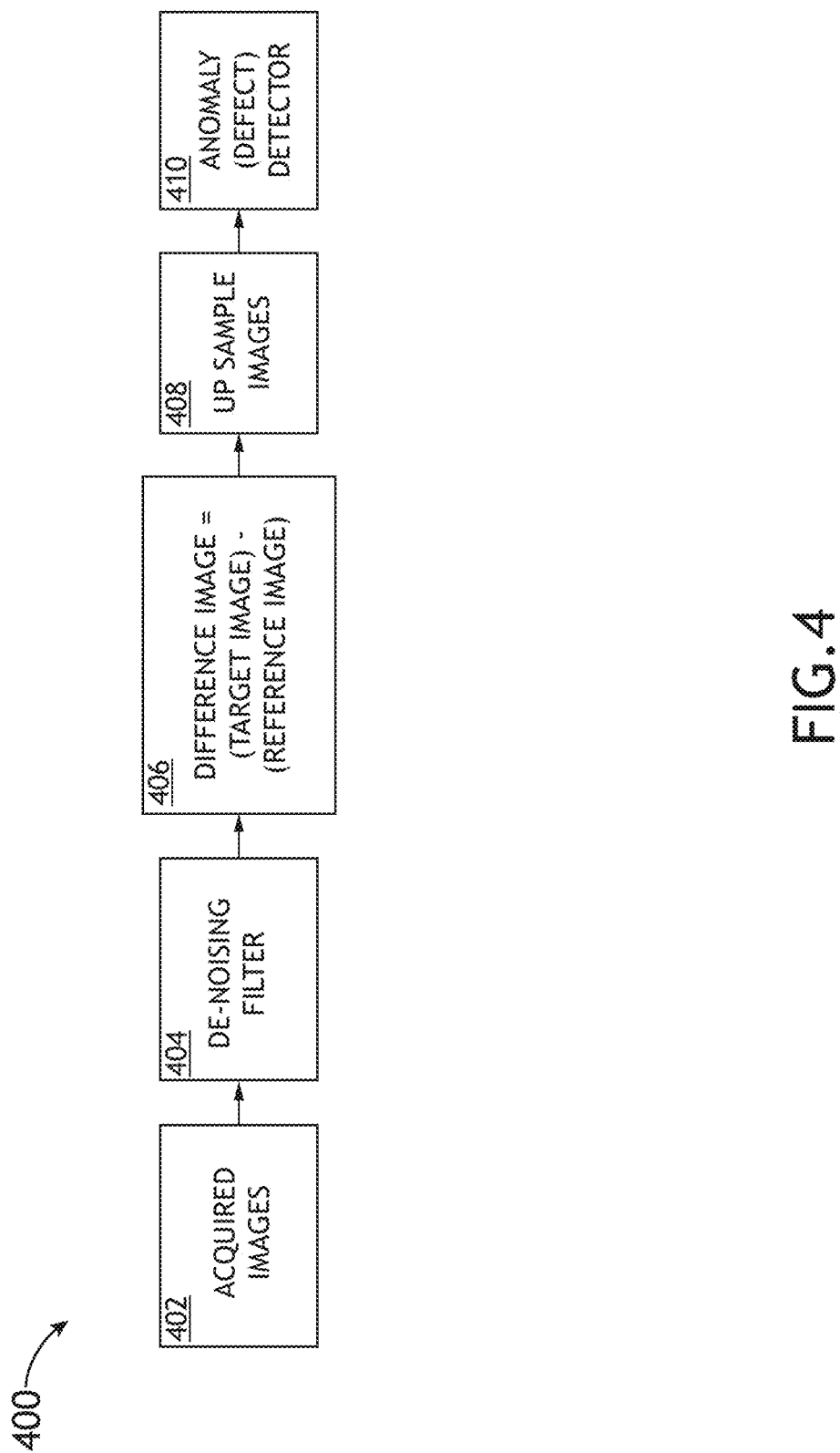
FIG. 4 illustrates a block diagram of a method for optical wafer characterization with image up-sampling, in accordance with one or more embodiments of the present disclosure.

FIG. 3 illustrates a flow diagram of a method or process 300 for optical wafer characterization with image up-sampling, in accordance with one or more embodiments of the present disclosure. FIG. 4 illustrates a block diagram 400 of the method or process 300 for optical wafer characterization with image up-sampling, in accordance with one or more embodiments of the present disclosure. One or more steps of the method or process 300 may utilize information such as one or more images from the system 100 and/or the system 200. One or more steps of the method or process 300 may be performed on or by one or more components of the system 100 and/or the system 200. For example, one or more steps of the method or process 300 may be performed by the processing unit 132 and/or the controller 110.

In a step 302, one or more reference images are acquired. In a step 304, one or more target images are acquired. For example, the one or more target images may be an image captured by the detector array 108 of a location (e.g., a field) on a die on a wafer 116 undergoing testing, and the one or more reference images may be an image captured by the detector array 108 of the same location (e.g., the field) from a proximate die (e.g., neighboring, adjacent, within a section distance from, or the like) on the wafer 116. By way of another example, the one or more target images may be an image captured by the detector array 108 of a location (e.g., a field) on a die on a wafer 116 undergoing testing, and the one or more reference images may be historical data of the same location (e.g., the field) from a die on another wafer 116. For instance, the one or more target images may be acquired at the preferred pixel size. The acquired images 402 may include the one or more reference images and the one or more target images. It is noted herein, however, the one or more target images are represented as the acquired images 402 (e.g., where the one or more reference images are historical data).

In one non-limiting example, a broadband plasma (BBP) inspection system 100, 200 is an automated inspection microscope for inspecting semiconductor wafers 116 for defects. The sample 116 may be on an actuated stage 118 that moves the sample 116 continuously. The sample 116 may be imaged onto a detector array 108 with a detector 130. The imaging optics of the system 100, 200 may include a zoom lens. For example, the magnification from the sample 116 to the detector array 108 may be adjusted by the zoom lens. For instance, at a large magnification (e.g., 600×) the image of one detector pixel on the sample 116 may be 600 times smaller than the actual dimension of a pixel of a detector 130, and the field of view of the detector 130 may be 600 times smaller than the detector array 108. The detector 130 may operate in the TDI mode. For example, the photo-generated charge carriers on a CCD detector 130 are swept by an applied electric field in synchronization with the motion of the image of the sample 116 across the CCD detector 130. The charges may be digitized when they arrive at an edge of the detector array 108.

The system 100, 200 may include a laser-pumped plasma light source 102 that radiates in a broad spectrum. Illumination optics within the illumination arm 104 may illuminate a portion of the sample 116. For example, the Illumination optics may insert a wavelength filter and/or a polarizer into the illumination arm 104. The field illuminated on the sample 116 may be fixed and independent of an imaging zoom setting of the collection arm 106. For example, the illuminated field on the sample 116 may need to be at least as large as the field of view of the detector 130 at the smallest magnification. It is noted herein the illuminated field may be fixed, as there is no zoom lens in the illumination optics because the etendue of the BBP light source 102 is too large to image all generated light on to the field of view of the detector 130 without losing light power. In this regard, the light flux F [photons/s/m$^2$] reflected from the sample 116 may be independent of imaging magnification.

For a pixel size p at the sample 116, the number of photons n that reach a detector 130 pixel per second is represented by n=η*F*p$^2$, where η is the transmission efficiency of the imaging system 100, 200 and the detector 130, and where p is the physical dimension of a pixel on the detector array 108 divided by the magnification in the collection arm 106.

For example, where TDI is clocked such that one line of pixels are digitized at the frequency $f_L$, the TDI integration time for each pixel is $T_{int}=n_x/f_L$, where $n_x$ is the number of pixels on the detector array 108 in the scan direction (e.g., x-direction). In addition, the speed v of the stage assembly 118 is $v=p*f_L$. Further, if the detector 130 is $n_x$ pixels tall in a y-direction, the detector 130 may scan a swath of wafer 116 area with a swath height $h_{swath}=p*n_x$. Further, the throughput of inspection (e.g., in wafers inspected per unit time) $T_{put}=v*h_{swath}/A=p^2*f_L*n_y/A$, where A is an area inspected on the sample 116. Further, the number of photons $n_v$ collected at a detector 130 pixel is represented by $n_v=\eta*F*p^2*T_{int}=\eta*F*p^2*n_x/f_L$. In combining the above, throughput is related to the number of photos at the detector 130 pixel as provided in EQ. 1:

$$T_{put}=p^2*f_L*n_y/A=p^4*F*n_x*n_y/A*n_v \qquad \text{EQ. 1}$$

It is noted herein that throughput $T_{put}$ is an increasing function of pixel size on the sample 116 with or without a filter. Where the number of photons per pixel is kept constant, throughput $T_{put}$ is proportional to $p^4$, or the pixel linear dimension on the sample 116 raised to the fourth power. Conversely, if we keep the throughput $T_{put}$ constant, the number of photons collected per pixel is proportional to $p^4$. This relationship holds until the detector saturates (e.g., the potential well of the CCD is filled). Applying a filter to an image, however, reduces throughput $T_{put}$ to be proportional to $p^2$ where short-noise variance is kept constant.

It is noted herein all acquired images 402 (e.g., the one or more target images and/or the one or more reference images) may be up-sampled prior to at least one of the applying of the de-noising filter 404 and/or the generation of the one or more difference images 406, where up-sampling is described in detail further herein.

In a step 306, a de-noising filter 404 is applied to the acquired images. For example, the one or more reference images and/or the one or more target images may be de-noised by a filter 404 that rejects spatial frequencies larger than $2*NA/\lambda\min$ in any direction in the frequency plane ($f_x$, $f_y$).

Spatial resolution of the system 100 may be dependent on how close two point may be put together and resolved. Optical images are band-limited in the spatial frequency plane, with the largest spatial frequency in the image in any direction not exceeding $f_{max}=2*NA/\lambda\min$ in both dark-field and/or bright-filed imaging systems, where NA is the numerical aperture of the imaging optics at the sample 116 side, $\lambda\min$ is the shortest or minimum wavelength in the spectrum of the light that is detected, and a unit of spatial frequency f is cycles per unit length. It is noted herein where NA is the detector-side numerical aperture, the spatial frequency is reciprocal distance at the array detector plane. In addition, it is noted herein where NA is the numerical aperture of the objective, the spatial frequency is reciprocal distance at the object (wafer) plane.

One advantage of the present disclosure is a spatial frequency filter, or band limiting filter (BLF). The BLF may pass all spatial frequencies in a circle of radius $2*NA/\lambda\min$ unaltered (e.g., transfer function amplitude=1, phase=0), and may block all frequencies outside the circle (e.g., transfer function amplitude=0). The BLF may not alter noise-free optical images (e.g., does not blur or distort them), such that alignment of images and/or image processing algorithms may not be adversely affected by the BLF. The BLF, however, may reject some of the noise in the images, improving the signal-to-noise ratio (SNR) of images. In this regard, the spatial frequency filter may be understood as being configured to remove a portion of noise in the one or more target images and/or the one or more reference images acquired by the array detector 108, and also configured to reduce alternation of a noise-free image.

Images contain shot-noise as the detector 130 detects an integer number of photons, subject to Poisson distribution. For a given light intensity, the mean number of photons detected is m, which may be a fractional number. The detector 130 may detect a random integer number of photons n, with probability $P(n)=e^{-m}*m^n/n!$. The random fluctuation of photon counts ($\sigma^2=m$) at the detector 130 pixels are uncorrelated between pixels. Therefore, shot-noise has white spectrum (e.g., its spatial-spectral-density is uniform), and the BLF may reject the spectral portion of this white noise outside the circle of radius $2*NA/\lambda\min$ without affecting the optical image.

Readout noise may be a cause of wide-band noise. For example, readout noise is caused by electronics during the analog to digital conversion of the output of the detector array 108. The BLF may reject the spectral portion of readout noise outside the circle of radius $2*NA/\lambda\min$.

In one non-limiting example, where the detector array 108 has N×N pixels with a pixel pitch of p, the detector array 108 may samples a 1/p by 1/p square region in the spatial frequency plane. Shot noise may be uniformly distributed in this plane when the gray level is uniform in the field of view, and the BLF may pass the shot noise in a circle of radius $2*NA/\lambda\min$. variance of the noise is reduced by a factor as provided in EQ. 2:

$$\frac{\text{Shot-noise variance after the filter}}{\text{Shot-noise variance before the filter}} = \qquad \text{EQ. 2}$$
$$4\pi(p*NA)^2/\lambda^2\min = \pi/4*(p/\Delta_{Nyquist})^2$$

where $\Delta_{Nyquist}=\tfrac{1}{2}f_{min}$.

When $p<\Delta_{Nyquist}$, the image is over-sampled, and a larger oversampling factor results in a greater signal-to-noise advantage of the filter. Shot noise and the optical image may become more separable when the image is over-sampled. The SNR may be improved by over-sampling factor by filtering the portion of the shot noise that is distinct from the optical image, and the improvement in SNR may be traded for speed. It is noted herein the filter reduces shot noise by about 20%, even when close to critical sampling.

FIGS. 5A and 5B are graphs 500 and 510, respectively, illustrating the separation of optical information 502 from noise 504 (e.g., shot noise, readout noise, and the like). In the non-limiting examples provided in FIGS. 5A and 5B, the optical information may be confined to a disk of radius $4\pi NA/\lambda\min$ and a filter value of 1, while the noise 504 may be outside the disk and given a filter value of 0. It is noted herein the more over-sampled a mode is (e.g., comparing the graph 510 with a $1/t_2 \times 1/t_2$ grid size versus the graph 500 with a $1/t_1 \times 1/t_1$ grid size), the greater the fraction of shot noise that may be removed.

In some embodiments, BLFs may be implemented in one of two ways—finite-impulse-response (FIR) and fast Fourier transform (FFT).

In the FIR implementation, the FIR is a straight convolution with a filter coefficient h. The filtered image may be calculated as provided in EQ. 3:

$$\text{Image}_{out}(x,y) = \sum_{x'=-N}^{N} \sum_{y'=-N}^{N} \text{Image}_{in}(x-x', y-y')h(x',y') \qquad \text{EQ. 3}$$

In EQ. 3, x and x' are integer indices of image and filter columns (respectively), and y and y' are integer indices of image and filter rows (respectively). Image$_{in}$ is the image acquired from the detector array, which is a 2-dimensional array of gray scale values, Image$_{out}$ is the output of the filter. The size of the filter is (2N+1)×(2N+1). Upon filtering, the first and last N columns and the first and last N rows of the image become invalid, causing an erosion of the image which may be compensated for by increasing the overlap between swaths of images that are processed independently. The filter coefficients h(x',y') may be determined by solving an optimization problem, in which the loss function in the optimization problem is the sum of squares of deviations of the Fourier transform of h(x', y') from the ideal transfer function, which is 0 outside the circle of radius 2*NA/λmin and 1 inside the circle.

The ideal transfer function is provided in EQ. 4:

$$\text{optimal } h = \underset{h}{\text{argmin}} \sum_{fx} \sum_{fy} |\hat{h}(f_x, f_y) - g(f_x, f_y)|^2 w(f_x, f_y) \quad \text{EQ. 4}$$

In EQ. 4, $\hat{h}(f_x, f_y)$ is the two-dimensional Fourier transform of $\hat{h}(x', y')$, and $g(f_x, f_y)$ is the goal for the transfer function of the filter as provided in EQ. 5:

$$g(f_x, f_y) = \begin{cases} 0, & \text{if } f_r > 2*NA/\lambda\text{min} \\ 1, & \text{if } f_r < 2*NA/\lambda\text{min} \end{cases} \quad \text{EQ. 5}$$

where $f_r = \sqrt{f_x^2 + f_y^2}$.

In EQ. 4, the weight function $w(f_x, f_y)$ may assist in relaxing the requirement to match the goal $g(f_x, f_y)$ around its discontinuity during the transition from the passband to stopband, as provided in EQ. 6:

$$w(f_x, f_y) = \begin{cases} 0, & \text{if } |f_r - 2*NA/\lambda\text{min}| < \epsilon * 2*NA/\lambda\text{min} \\ 1, & \text{if } |f_r - 2*NA/\lambda\text{min}| \geq \epsilon * 2*NA/\lambda\text{min} \end{cases} \quad \text{EQ. 6}$$

In one non-limiting example, $\epsilon$ is set to 0.05 in EQ. 6. It is noted herein that not enforcing the transmission function within ±5% of the radius of the circular passband may improve the transmission in the passband and attenuation in the stopband outside the ±5% margin.

In the FFT implementation, a Fourier transform is real-valued and has the same symmetry as the filter is constrained to be symmetric as provided in EQ. 7:

$$h(x,y) = h(-x,y) = h(x,-y) = h(y,x) \quad \text{EQ. 7}$$

Figure 6A:
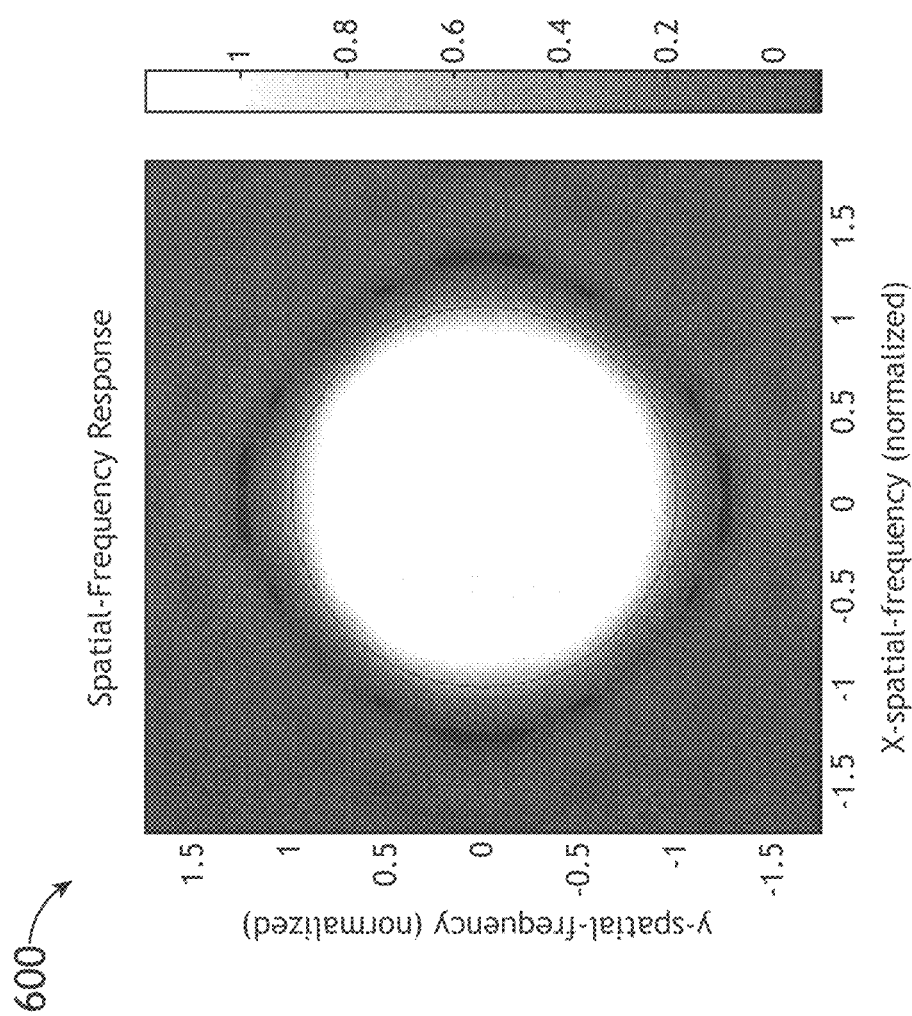
FIG. 6A is an image of a circle representing a transfer function of a finite-impulse-response (FIR) filter, in accordance with one or more embodiments of the present disclosure.

FIG. 6A illustrates an image 600 of a circle representing the transfer function of a 15×15 FIR filter designed for a 30 nanometer (nm) pixel pitch, 0.9 NA, and 190 nm minimum wavelength. In the image 600, the spatial frequency axes $f_x$ and $f_y$ are normalized by $f_{max} = 2*NA/\lambda\text{min}$.

FIG. 6B illustrates a graph 610 comparing a transfer function of the 15×15 FIR filter designed for a 30 nanometer (nm) pixel pitch, 0.9 NA, and 190 nm minimum wavelength, versus a x-spatial frequency that is normalized (e.g., the section through zero y-spatial frequency, or $f_y=0$). In the graph 610, the spatial frequency axis is normalized by $f_{max} = 2*NA/\lambda\text{min}$.

The FFT implementation is provided in EQS. 8 and 9:

$$\text{Image}_{out} = \mathcal{F}^{-1}\{h(f_x, f_y)\mathcal{F}\text{Image}_{in}\} \quad \text{EQ. 8}$$

-continued $$h(f_x, f_y) = \begin{cases} 1, & \text{if } f_r < f_{max} \\ \cos^{2\pi(f_r - f_{max}/2\epsilon f_{max})}, & \text{if } f_{max} \leq f_r \leq (1+\epsilon)f_{max} \\ 0, & \text{if } f_r > (1+\epsilon)f_{max} \end{cases} \quad \text{EQ. 9}$$

where $f_r^2 = f_x^2 + f_y^2$.

In EQS. 8 and 9, $\mathcal{F}$ is the FFT, $\mathcal{F}^{-1}$ is the inverse FFT, $f_x$ and $f_y$ are spatial frequency variables (e.g., the transform variables), and $f_r$ is the radial spatial frequency. The dimensionless variable $\epsilon$ may be much smaller than 1 (e.g., 0.05, or the like), and may define the width of the smooth cosine transition from the passband to the stopband. It is noted herein the smooth transition may reduce ringing (e.g., oscillations) in the Image$_{out}$(x,y).

In EQS. 8 and 9, the FFT $\mathcal{F}$ results in a circle with a selected image frequency being within the circle and a non-selected image frequency and/or noise being outside the circle, allowed the noise to be removed before calculating the inverse FFT $\mathcal{F}^{-1}$.

In comparing the FIR implementation and the FFT implementation, it is noted the FFT implementation of BLF may approximate the ideal transfer function better than the FIR implementation of BLF, when the size of the input image is large (e.g., 1024×1024 pixels) and the FIR filter size is small (e.g., 20×20 pixels). As such, the FFT implementation may provide greater accuracy.

However, the FIR implementation may be preferred for computational throughput. It is noted herein the FIR implementation (e.g., a 15×15 FIR filter) may be applied to the raw images acquired via the one or more detectors 130 by the processing unit 132 (e.g., where the processing unit 132 is positioned between the detector array 108 and the controller 110 within the system 100, or within the detector array 108 and configured to receive the raw images prior to transmission to the controller 110).

It is noted herein that different SNR and/or different NA may require different filters. As such, embodiments of the present disclosure are directed to a dynamic optical setup where the filter may be adjusted, depending on the SNR and/or NA.

Although embodiments of the present disclosure illustrate the implementation of a de-noising filter, it is noted herein the de-noising filter 404 may be omitted from the method or process 300. Therefore, the above description should not be interpreted as a limitation on the present disclosure but merely an illustration.

In a step 308, one or more difference images 406 are determined from the one or more acquired images. For example, the one or more difference images 406 may be determined by modifying the one or more target images with the one or more reference images. For instance, the one or more difference images 406 may be determined by subtracting the one or more reference images from the one or more target images.

In a step 310, the one or more difference images 406 are up-sampled to generate one or more up-sampled images 408. For example, one or more wafer defects may be detectable in the one or more up-sampled images 408.

It is noted herein a small pixel size on the wafer (e.g., a high magnification) has a sensitivity advantage. Different regions in the integrated circuit design for the wafer-under-test may be inspected with different sensitivity settings, and the mapping of image to design features may be completed by assigning a region ID to each image pixel. In general, integrated circuit design features may be two to three times smaller than the pixels of the optical image. As such, if the pixels are smaller, the mapping to design features is more useful.

Although a small pixel size for purposes of sensitivity, a large pixel size (e.g., a small magnification) is preferred in terms of throughput. Embodiments of the present disclosure are directed to improving the trade-off between throughput and sensitivity by acquiring images at the largest pixel size that is not under-sampled, and up-sampling images algorithmically. It is noted herein that up-sampling may provide an increased chance to find the peak of a signal, giving a higher strength of signal. In addition, it is noted herein up-sampling may provide an increased chance to align images with actual designs, as opposed to when a smaller pixel is used.

To avoid under-sampling (e.g., aliasing) the pixel pitch should satisfy the inequality p<λmin/4*NA. For example, the preferred pixel size on the wafer 116 is the largest pixel size that satisfies the inequality p<λmin/4*NA with a 5% margin.

In one non-limiting example of up-sampling, up-sampling is performed by the Whittaker-Shannon interpolation, as provided in EQ. 10:

$$\text{Image}_{out}(x, y) = \sum_{m=-N}^{N} \sum_{n=-N}^{N} \text{Image}_{in}(m, n) \text{sinc}(x/p - m) \text{sinc}(y/p - n) \quad \text{EQ. 10}$$

In EQ. 10, p is the sampling interval of $\text{Image}_{in}(m,n)$, and integers m and n are column and row indices of the image that is being interpolated, respectively. The interpolation output is $\text{Image}_{out}(x,y)$, where (x,y) is the coordinates of the center of a pixel of the output image. The variables x, y, and p have the same distance unit, and the pixels of the up-sampled image $\text{Image}_{out}(x,y)$ are smaller than p. The normalized sinc function may be defined as $\text{sinc}(z)=\sin(\pi z)/\pi z$.

The interpolation error approaches zero as the integer N approaches infinity. For purposes of the present disclosure, one preferred computational throughput and interpolation accuracy is obtained at N=6. However, any interpolation that is successful as long as p<λmin/4*NA, which ensures that the optical image is over sampled according to the Nyquist theorem, is usable for purposes of the present disclosure.

In another non-limiting example of up-sampling, applying image interpolation or up-sampling on a subset of image data that satisfies the Nyquist criterion (e.g., which states an image must be sampled at a rate at least twice the highest frequency in the continuous analog image) using only imagery from defects passing the detection algorithm may result in improved defect signals within the defect patch and can be used for additional post-processing filtering or extraction of improved features for nuisance and/or binning. For example, it may be desirable to use a large pixel size that violates the Nyquist criterion in order to meet inspection throughput goals or achieve adequate light budgets in low-light dark field optical modes.

Figure 7:
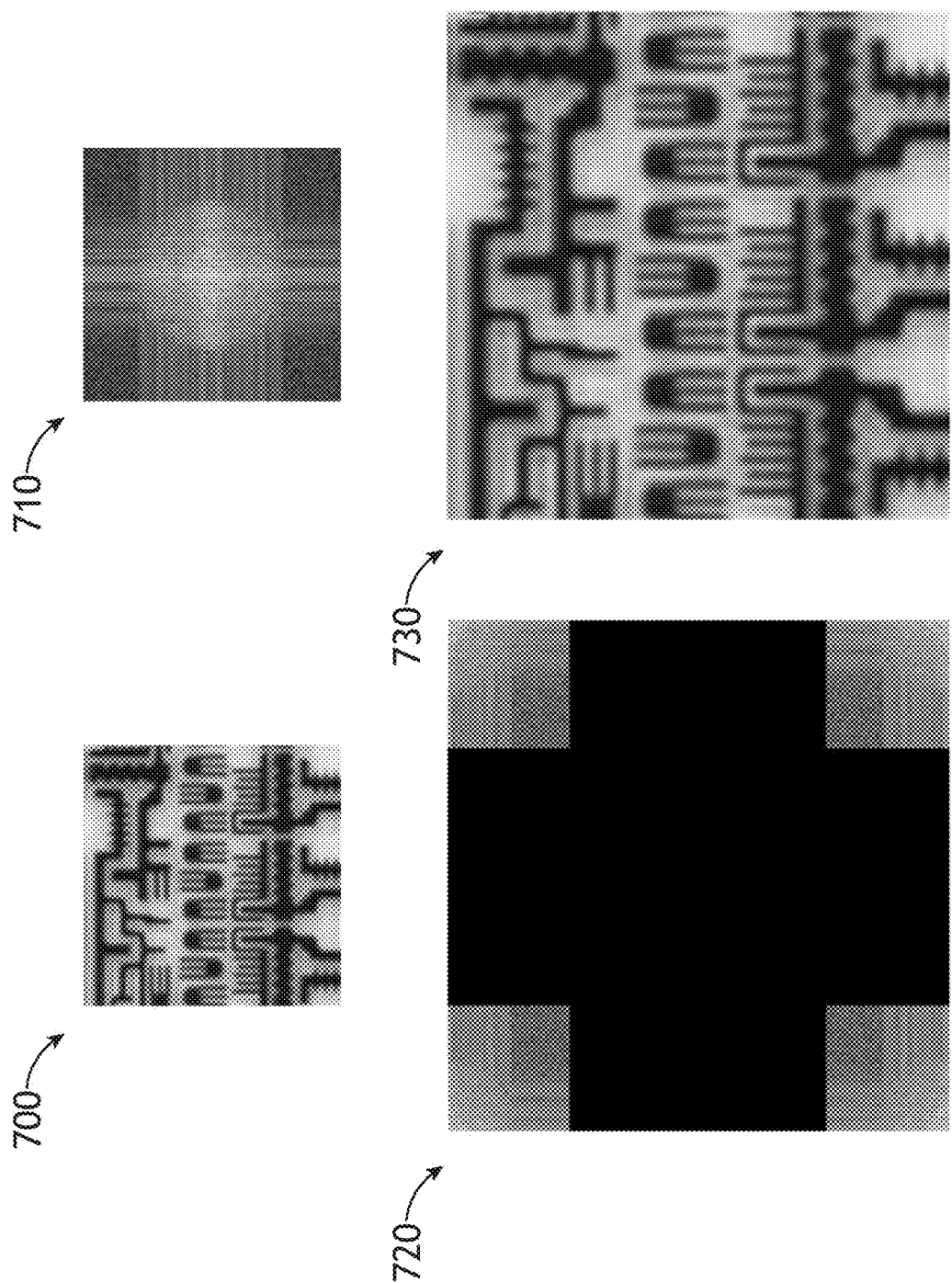
FIG. 7 is sequence of images illustrating a process of up-sampling using frequency domain zero-padding, in accordance with one or more embodiments of the present disclosure.

FIG. 7 is a sequence of images 700, 710, 720, 730 illustrating a process of up-sampling using frequency domain zero-padding. In one non-limiting example, up-sampling may be achieved by the taking 2-dimensional FFT $\mathcal{F}$ of $\text{Image}_{in}$ (e.g., image 700 to image 710), multiplying or zero-padding the transform array (image 710 to image 720), and taking the inverse FFT $\mathcal{F}^{-1}$ of the padded array (e.g., image 720 to image 730). The zero-padded spectrum may be inverse transformed, the result of which includes the interpolated values, which may be controlled by the extent of zero padding in the frequency domain. For example, up-sampling by a factor of two (e.g., interpolating equidistant points between original pixels) is achieved by zero padding by a factor of two.

Sampling the defect signal is a statistical process and any single acquisition may result in more or less SNR improvement by up-sampling. To further improving the defect SNR may be accomplished via a diff-filter/dif-filter designed to enhance defect energy while reducing the noise. For example, the diff-filter/dif-filter may be applied prior to the up-sampling. As such, the up-sampling may be combined with the diff-filter/dif-filter and/or the de-noising filter which implements FIR and/or FFT to improve an up-sampled pixel as compared to a smaller pixel, obtaining an improved trade-off between throughput and sensitivity. For example, up-sampling the diff-filter/dif-filter may result in an improvement in noise. It is noted herein, however, that a diff-filter/dif-filter may degrade defect SNR if improperly designed, while up-sampling will not degrade the defect SNR.

Figure 8B:
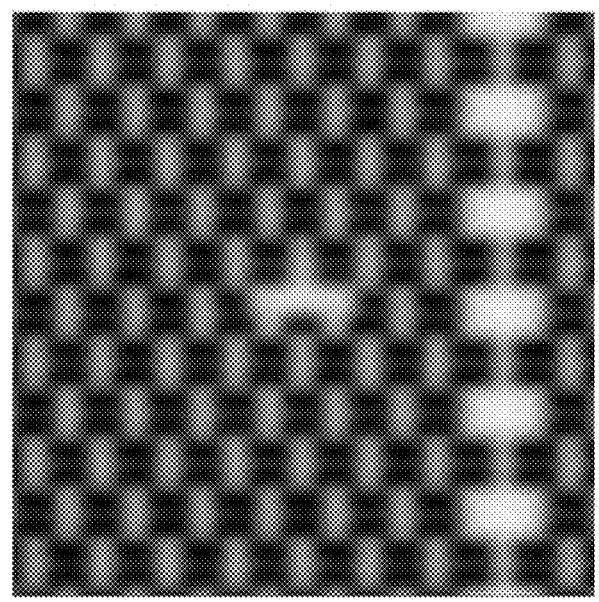
FIG. 8B is a reproduction BF image, in accordance with one or more embodiments of the present disclosure.
Figure 8A:
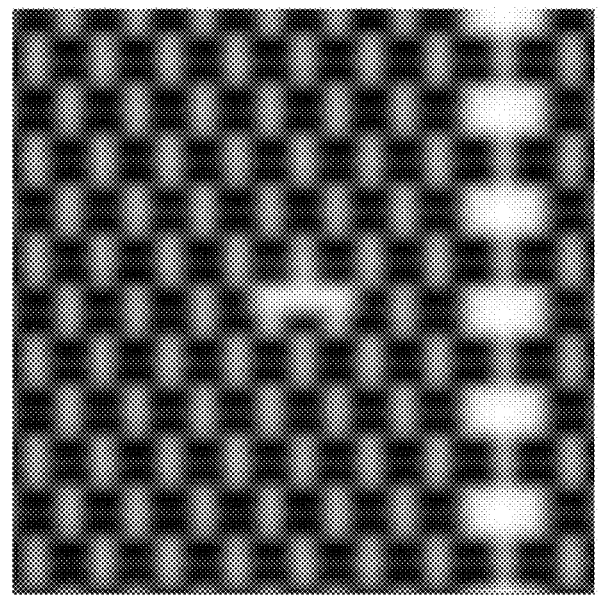
FIG. 8A is an original brightfield (BF) image, in accordance with one or more embodiments of the present disclosure.

FIGS. 8A and 8B illustrates images 800 and 810, respectively, of brightfield (BF) images. In FIG. 8A, the image 800 includes an actual 36 nm BF image; in FIG. 8B, image 810 includes a 36 nm BF image reconstructed from a 50 nm image through up-sampling, with an up-sampling factor of 50/36=1.39. From a comparison between FIGS. 8A and 8B, the 36 nm BF image is reproduced with a high-degree of accuracy, as shown in a cross-section comparison. In select cases, an actual 36 nm pixel may show up to a 15% improvement over the 50 nm pixel, and the 36 nm up-sample may show a 10% improvement over the 50 nm pixel.

Figure 9A:
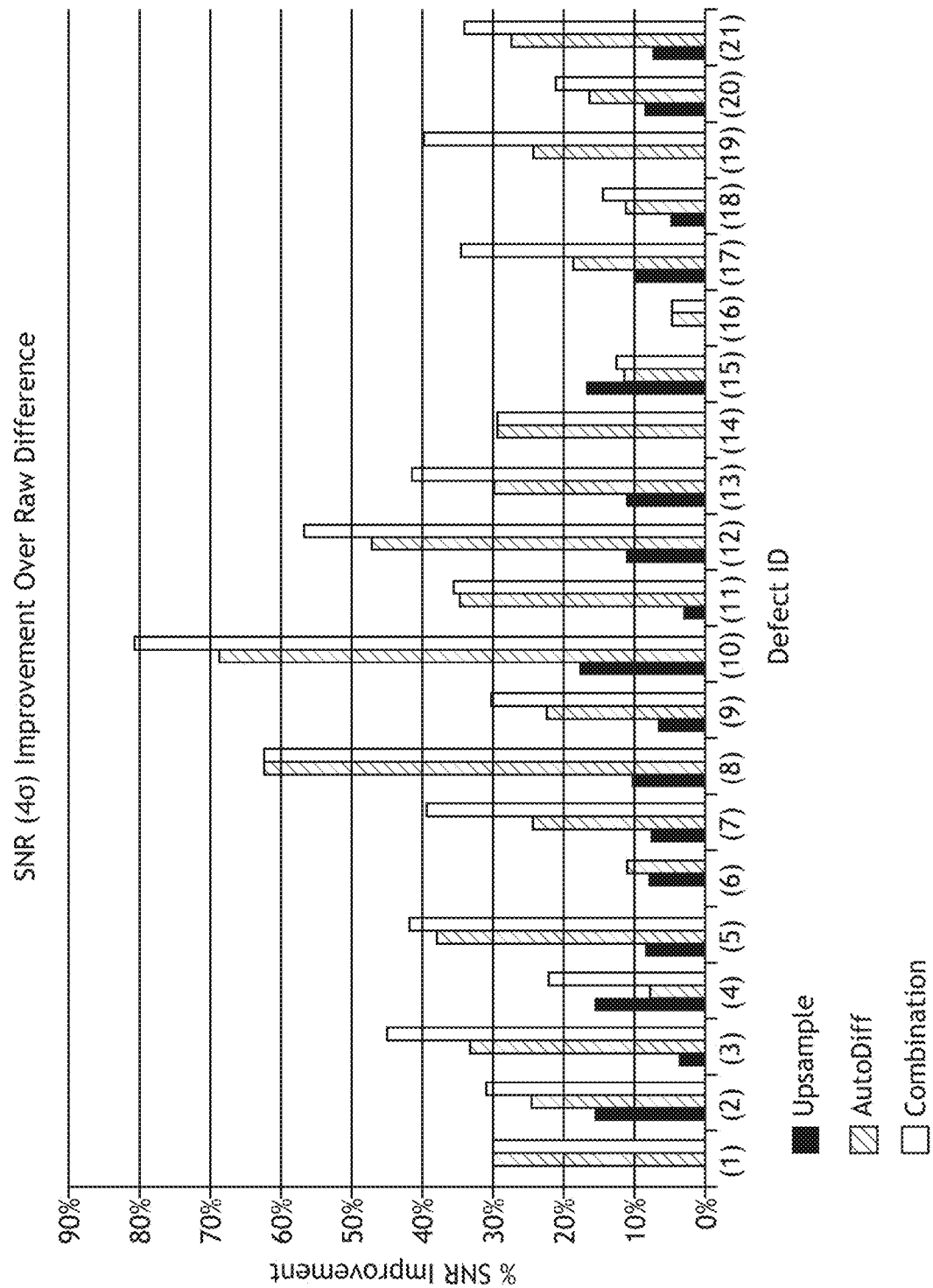
FIG. 9A is a graph comparing filters utilizing up-sampling, difference filters, and a combination of up-sampling and difference filters, in accordance with one or more embodiments of the present disclosure.
Figure 9B:
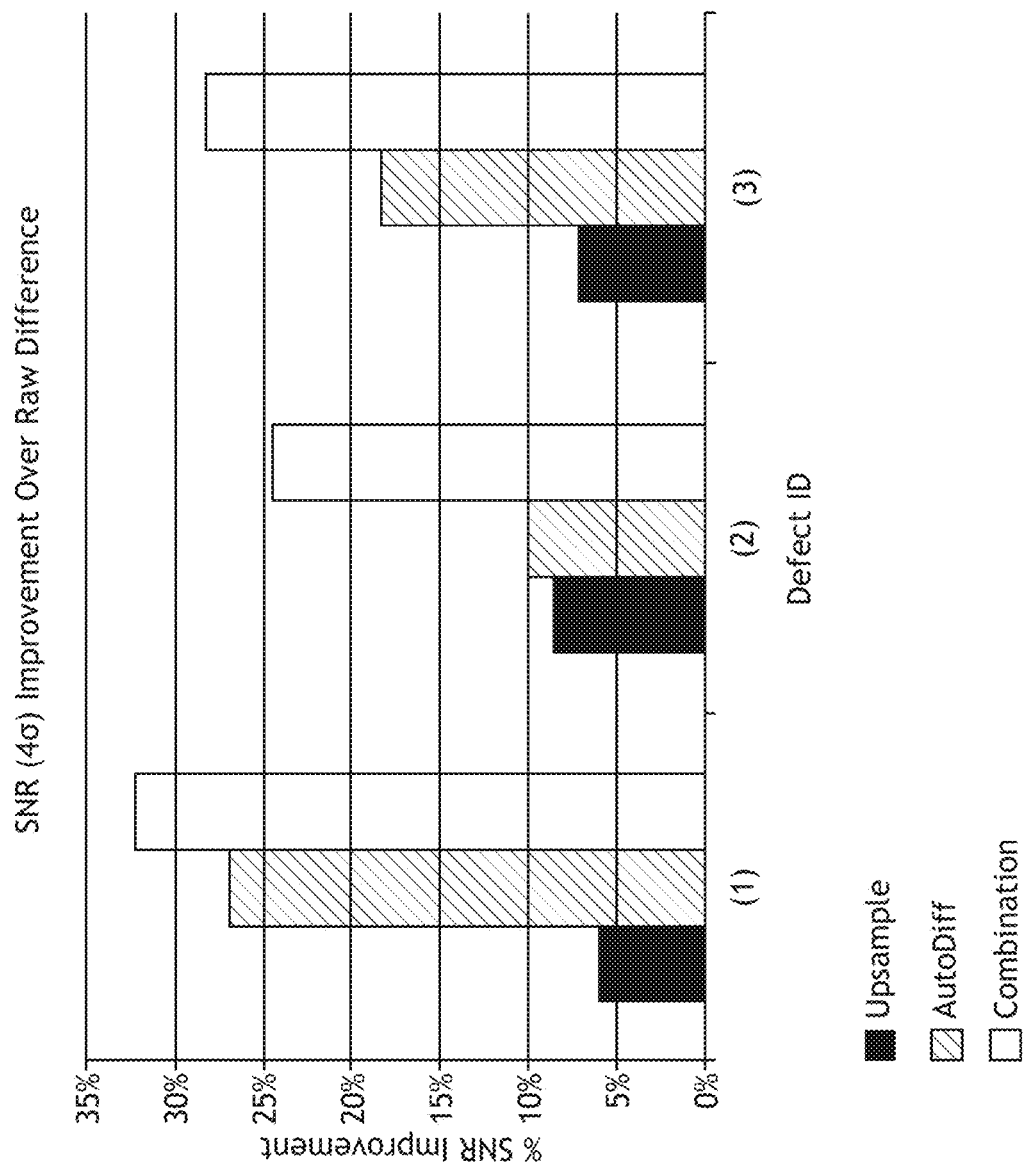
FIG. 9B is a graph comparing filters utilizing up-sampling, difference filters, and a combination of up-sampling and difference filters, in accordance with one or more embodiments of the present disclosure.

FIGS. 9A and 9B illustrate graphs 900 and 910, respectively, of the % SNR improvement for various defects by comparing up-sampling (e.g., Upsample), diff-filters/dif-filters (e.g., AutoDiff), and a combination of up-sampling and diff-filters/dif-filters (e.g., Combination). As illustrated in FIGS. 9A and 9B, the combination of up-sampling and diff-filters/dif-filters provides a greater improvement than either the up-sampling or the diff-filters/dif-filters, alone. In select cases, the improvement in up-sampling averages 7-8%, the improvement by the diff-filter/dif-filter averages from 18-28%, and the improvement by the combination of the diff-filter/dif-filter and the up-sampling increases the improvement by an additional 6-9%.

In attempts to further improve defect SNR, anti-aliasing pre-filtering may by implemented on aliased inspection modes in Field-to-Field inspections, where fields may be understood as locations such as repeating logic pattern regions within a die which are comparable to one another. Image aliasing is the error resulting from the digitization of imagery at a rate insufficient to capture all image frequencies passing through the optical system, and anti-aliasing may be a filtering procedure used in digital image and signal processing to limit the frequency content in the analog image or signal prior to digitization, where the filter must be designed such that the Nyquist criterion is satisfied and no aliasing occurs.

Strategies for reducing aliasing may be found in U.S. Pat. No. 8,947,521, issued on Feb. 3, 2015, which is incorporated herein in the entirety. In one non-limiting example of the application of the strategies, a TDI-based method for an anti-aliasing pre-filter may include intentionally inducing blur in an image in x and/or y across the one or more detectors 130. The blur may be introduced in the imagery on the TDI prior to readout by inducing a small error in either the TDI clock, stage speed, or image magnification. For an N-pixel width TDI, imparting a 2/N error in the nominal TDI magnification will introduce a two-pixel blur in the final image. This blur may be modeled as a convolution with a rectangular function in the image domain, or equivalently a multiplication by a sinc function in the spatial frequency domain. This resulting sinc pre-filter may include sidelobes resulting in some aliasing energy leakage into the passband.

The imaging domain composite equation including enpixelation and image blur is as provided in EQ. 11:

$$I(x) \circledast \prod\left(\frac{x}{s}\right) \circledast \left[\prod\left(\frac{x}{E}\right) \cdot III_{E/N}(x)\right] \qquad \text{EQ. 11}$$

where I(x) is the true image, s is the pixel size and E is the blur amount in pixels.

The corresponding Modulation Transfer Function in the frequency domain is provided in EQ. 12:

$$\left[MTF_{optical} \cdot \frac{\sin(\pi f s)}{\pi f s}\right] \cdot \left[\frac{\sin(\pi f E)}{\pi f E} \circledast III_{N/E}(f)\right] \qquad \text{EQ. 12}$$

It is noted herein the required blur to minimize the aliasing energy and generate a spatial frequency cutoff at one-half the sampling frequency may be a value of approximately two pixels. For example, for a given undersampled pixel rate r the frequency content must be limited to r/2, requiring a two-pixel blur.

Figure 10B:
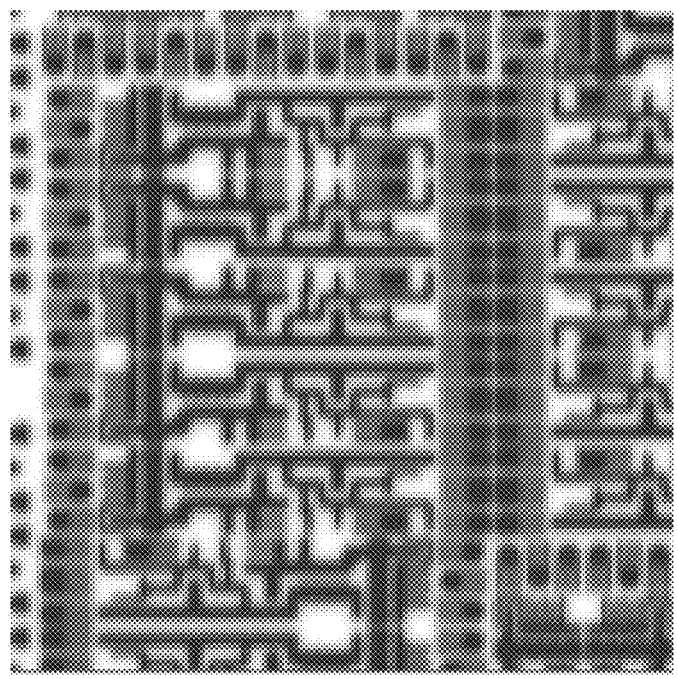
FIG. 10B illustrates a blurred image with a two-pixel blur, in accordance with one or more embodiments of the present disclosure.
Figure 10A:
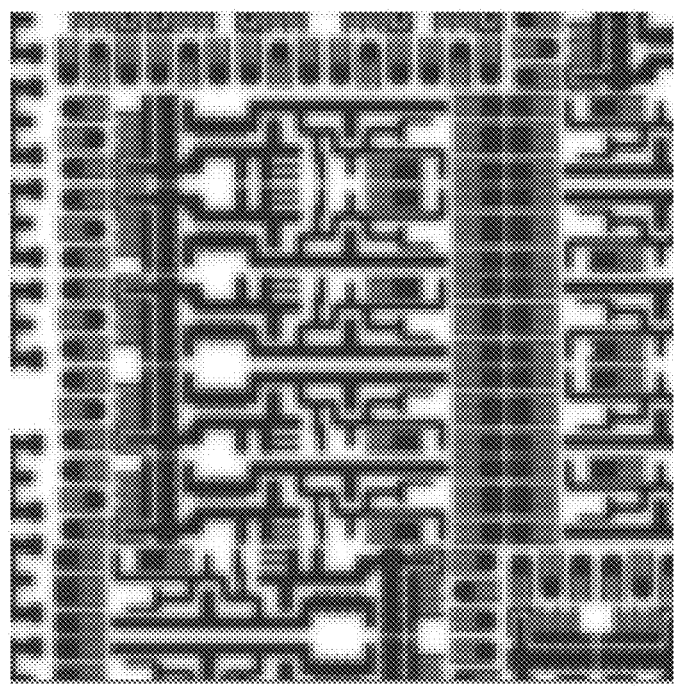
FIG. 10A illustrates a non-blurred image, in accordance with one or more embodiments of the present disclosure.

FIGS. 10A and 10B illustrate images 1000 and 1010, respectively. In FIG. 10A, the image 1000 is non-blurred; in FIG. 10B, the image 1010 is anti-aliased with a two-pixel blur. From a comparison of FIGS. 9A and 9B, it can be seen the two-pixel blur results in significant attenuation of the high frequency spectral X content.

Figure 11:
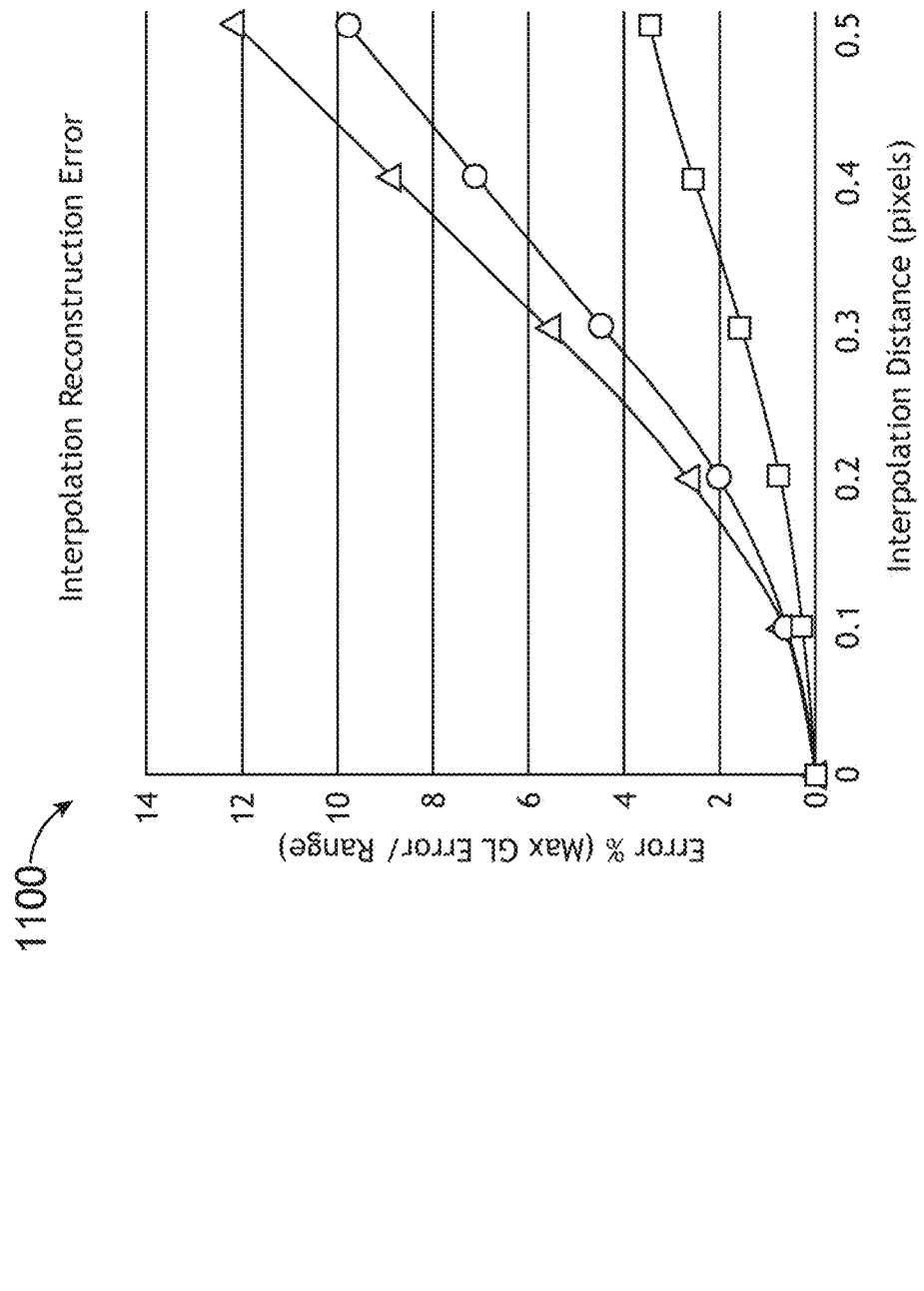
FIG. 11 is a graph comparing interpolation reconstruction error following no blurring, a one-pixel blur, and a two-pixel blur, in accordance with one or more embodiments of the present disclosure.

FIG. 11 is a graph 1100 illustrating interpolation reconstruction error by comparing error percentage (%) to interpolation distance for a non-blurred (e.g., non-filtered) image, an image with one-pixel blur, and an image with two-pixel blur. As illustrated in FIG. 11, it can be seen that one-pixel blur may be insufficient to reduce the aliasing noise, that two-pixel blur instead results in an error <5% typically associated with minimal aliasing.

Figure 12B:
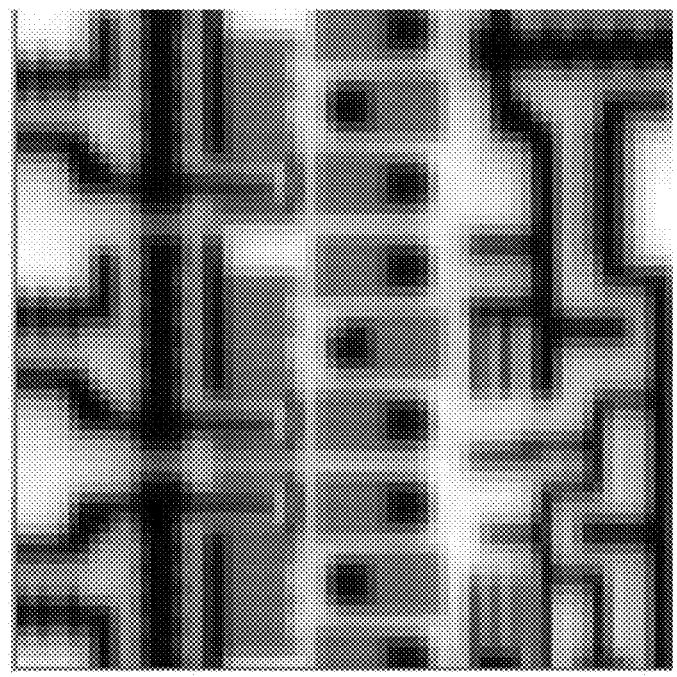
FIG. 12B illustrates an anti-aliased image, in accordance with one or more embodiments of the present disclosure.
Figure 12A:
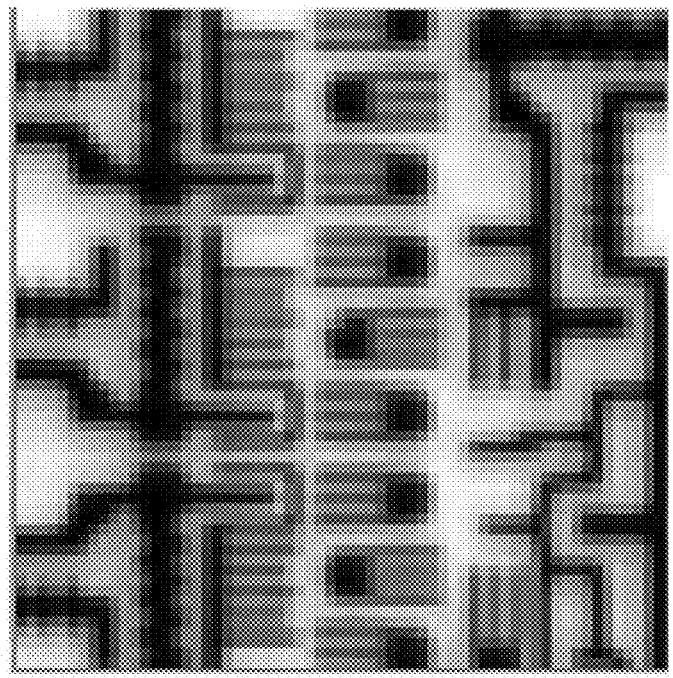
FIG. 12A illustrates an aliased image, in accordance with one or more embodiments of the present disclosure.

FIGS. 12A and 12B illustrate images 1200 and 1210, respectively, for a population of defects. In FIG. 12A, an aliasing target is illustrated (e.g., including no pre-filtering); in FIG. 12B, an anti-aliasing target is illustrated. From a comparison between FIGS. 12A and 12B when Field-to-Field inspection was performed, SNR was improved by approximately 2× for Field-to-Field inspections of aliased modes, as compared to Field-to-Field inspections with no pre-filtering. In select cases, a defect signal may see an average improvement of 14-20% where anti-aliasing is applied during Field-to-Field inspections.

Figure 13:
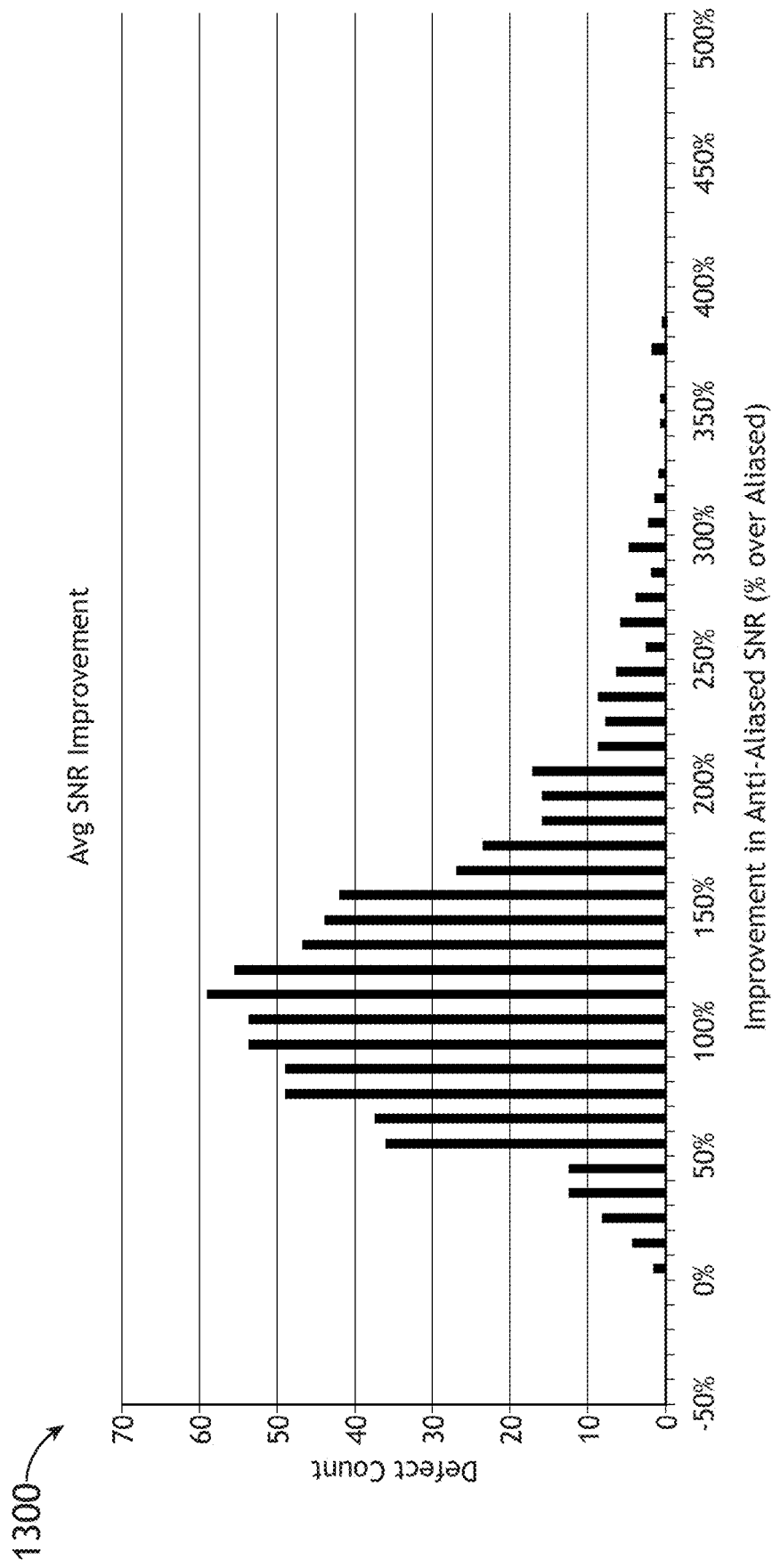
FIG. 13 is a graph illustrating average signal-to-noise ratio (SNR) improvement by comparing defect count to improvement in anti-aliased SNR an anti-aliased image, in accordance with one or more embodiments of the present disclosure.

FIG. 13 is a graph 1300 illustrating average SNR improvement by comparing defect count to improvement in anti-aliased SNR as a percentage over aliased. As illustrated in FIG. 13, in select cases an average improvement of 117% was observed when anti-aliasing pre-filtering was applied to images.

It is noted herein that Die-to-Die inspection may see a slight reduction in average defect signal and SNR with anti-aliasing, but that the slight reduction is offset and/or exceeded by the improvements caused by the anti-aliasing techniques in Field-to-Field inspection.

In a step 312, the one or more up-sampled images 408 are passed through an anomaly (or defect) detector. An anomaly detector 410 seeks pixel values that are substantially above or below a background. For example, the anomaly detector 410 may search for pixel values that exceed a set threshold above or below the background. For instance, the anomaly detector 410 may adjust or remove up-sampled image pixel values that exceed the set threshold above or below the background. It is noted herein the target and reference images are preferably identical, and their difference is zero, except where there is a defect. However, as neighboring dies are not identical, the difference image is often nonzero.

In this regard, the lowest magnification that is consistent with over-sampling the optical image is selected, and smaller pixel sizes are obtained by up-sampling the image. In particular, this improves the signal to shot-noise ratio if the optical image doesn't saturate the detector 130. In addition, this is particularly advantageous if the illumination is not strong enough to take advantage of well-depth, hence the dynamic range of the detector array 108.

In a step 314, one or more control signals to make one or more adjustments to the one or more optical inspection components are determined. For example, the one or more control signals may be determined based on the one or more up-sampled images. By way of another example, the one or more control signals may be determined based on the one or more difference images (e.g., instead of or in addition of the determining of the one or more control signals based on the one or more up-sampled images). In general, the one or more control signals may be configured to selectively adjust one or more characteristics of one or more components of the system 100 and/or the system 200.

It is noted that the embodiments and enabling technologies described previously herein in the context of system 100 and/or system 200 should be interpreted to extend to the method or process 300. In this regard, the steps of method or process 300 may be carried out by system 100 and/or system 200, and the method or process 300 may further include one or more steps required or implied by the architecture of system 100 and/or system 200. However, the method or process 300 is not limited to the architecture of system 100 and/or system 200, and it is recognized that one or more steps of method or process 300, or portions thereof, may be carried out with alternative system components and/or architecture. Furthermore, the steps of method or process 300 can be carried out in any order unless otherwise specified herein.

Figure 14:
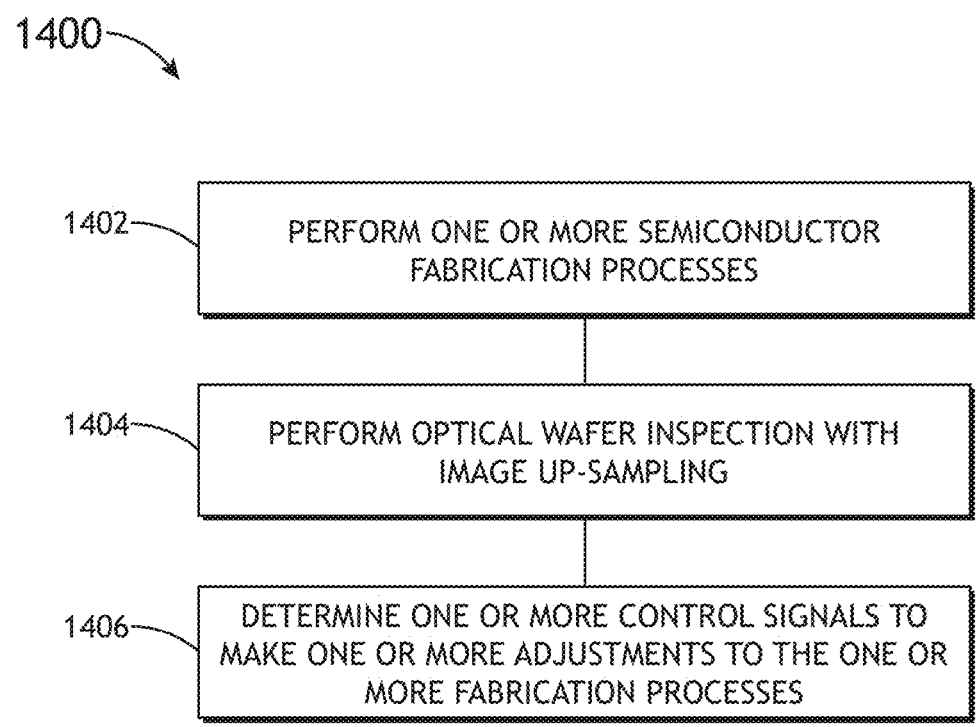
FIG. 14 is a flow diagram illustrating steps performed in a method for optical wafer characterization with image up-sampling, in accordance with one or more embodiments of the present disclosure.
Figure 15:
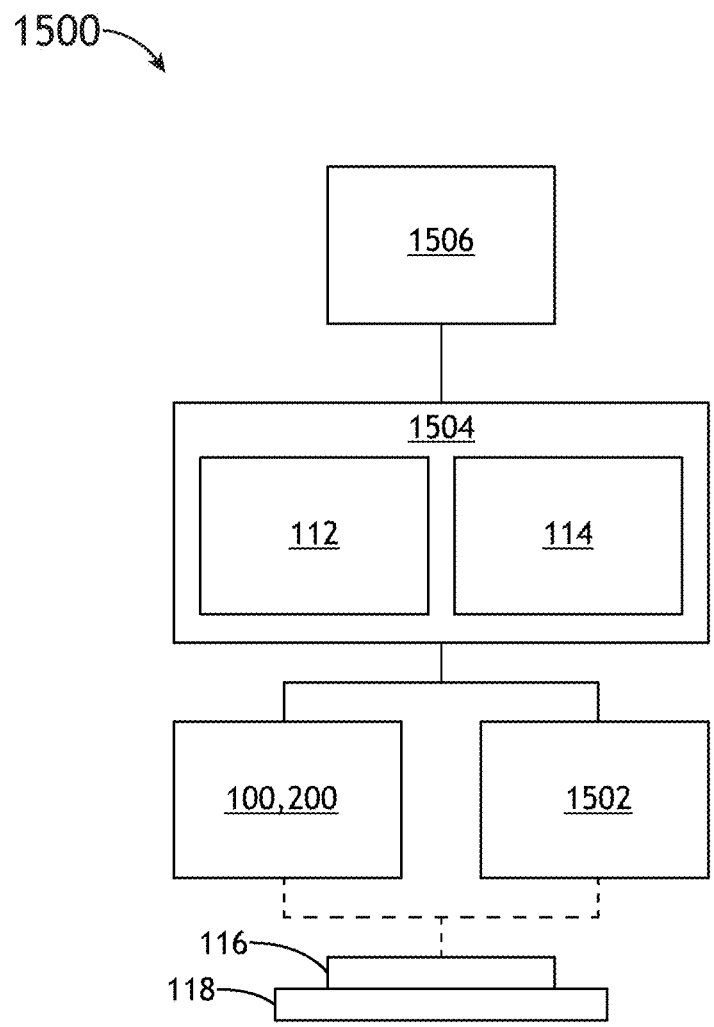
FIG. 15 illustrates a simplified schematic view of a system for optical wafer characterization with image up-sampling, in accordance with one or more embodiments of the present disclosure.

FIG. 14 illustrates a method or process 1400, in accordance with one or more embodiments of the present disclosure. FIG. 15 illustrates a system 1500 for performing one or more steps of the method or process 1400, in accordance with one or more embodiments of the present disclosure. The method or process 1400 may utilize information from the system 1500. The method or process 1400 may be performed on or by one or more components of the system 1500.

In a step 1402, one or more semiconductor fabrication processes are performed. The one or more semiconductor fabrication processes may be performed on the sample 116 by one or semiconductor fabrication tools 1502. For example, the one or semiconductor fabrication tools 1502 may include any process tool for microelectronics fabrication known in the art including, but not limited to, a lithography tool and/or a plasma process tool (e.g., an etching tool, a deposition tool, a polishing tool, a scanner, or the like).

In a step 1404, optical wafer characterization with image up-sampling is performed. For example, one or more of the steps of the method or process 300 is performed by the system 100 and/or the system 200, as described throughout the present disclosure.

In a step 1406, one or more control signals to make one or more adjustments to the one or more fabrication processes are determined. For example, the one or more control signals may be determined based on one or more up-sampled images generated via one or more of the steps of the method or process 300. By way of another example, the one or more control signals may be determined based on one or more difference images generated via one or more of the steps of the method or process 300 (e.g., instead of or in addition of the determining of the one or more control signals based on the one or more up-sampled images). In general, the one or more control signals may be configured to selectively adjust one or more characteristics of one or more components of the system 100 and/or the system 1500.

The one or semiconductor fabrication tools 1502 may be communicatively coupled to a controller 1504 including the one or more processors 112 and memory 114.

The controller 1504 may be communicatively coupled to the system 100 and/or the system 200. It is noted herein the controller 1504 may be separate from and communicatively coupled to the controller 110 either directly or via a third-party server. In addition, it is noted herein the controller 110 may be shared by the one or more semiconductor fabrication tools 1502, the system 100, and/or the system 200 (e.g., such that the controller 1504 may not be necessary).

The controller 1504 may be configured to generate one or more control signals configured to adjust one or more characteristics of one or more process tools in a feedforward or a feed-back loop based on inputs received from the system 100 and/or the system 200. The controller 1504 may be coupled to a user interface 1506.

The one or more processors 112 may include any one or more processing elements known in the art. In this sense, the one or more processors 112 may include any microprocessor-type device configured to execute software algorithms and/or instructions. The one or more processors 112 may consist of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. Furthermore, it should be recognized that the steps described throughout the present disclosure may be carried out on any one or more of the one or more processors 112. In general, the term "processor" may be broadly defined to encompass any device having one or more processing elements, which execute program instructions from memory 114. Moreover, different subsystems of the system 100 (e.g., detector array 108, processing unit 132, user interface 1506, or the like) may include or be processor or logic elements suitable for carrying out at least a portion of the steps described throughout the present disclosure. Therefore, the above description should not be interpreted as a limitation on the present disclosure but merely an illustration.

The memory 114 may include any storage medium known in the art suitable for storing program instructions executable by the associated one or more processors 112 and the data received from the metrology sub-system. For example, the memory 114 may include a non-transitory memory medium. For instance, the memory 114 may include, but is not limited to, a read-only memory (ROM), a random-access memory (RAM), a magnetic or optical memory device (e.g., disk), a magnetic tape, a solid-state drive and the like. It is further noted that memory 114 may be housed in a common controller housing with the one or more processors 112. In an alternative embodiment, the memory 114 may be located remotely with respect to the physical location of the processors 112, controller 110, controller 1504, or the like. In another embodiment, the memory 114 maintains program instructions for causing the one or more processors 112 to carry out the various steps described through the present disclosure.

In embodiments, a user interface 1506 is communicatively coupled to the controller 1504. In embodiments, the user interface 1506 may include, but is not limited to, one or more desktops, tablets, smartphones, smart watches, or the like. In another embodiment, the user interface 1506 includes a display used to display data of the system 100 to a user. The display of the user interface 1506 may include any display known in the art. For example, the display may include, but is not limited to, a liquid crystal display (LCD), an organic light-emitting diode (OLED) based display, or a CRT display. Those skilled in the art should recognize that any display device capable of integration with a user interface 1506 is suitable for implementation in the present disclosure. In another embodiment, a user may input selections and/or instructions responsive to data displayed to the user via a user input device of the user interface 1506.

It is noted that the embodiments and enabling technologies described previously herein in the context of system 1500 should be interpreted to extend to the method or process 1400. In this regard, the steps of method or process 1400 may be carried out by system 1500, and the method or process 1400 may further include one or more steps required or implied by the architecture of system 1500. However, the method or process 1400 is not limited to the architecture of system 1500, and it is recognized that one or more steps of method or process 1400, or portions thereof, may be carried out with alternative system components and/or architecture. Furthermore, the steps of method or process 1400 can be carried out in any order unless otherwise specified herein It is noted herein the methods or processes 300, 1400 are not limited to the steps and/or sub-steps provided. The methods or processes 300, 1400 may include more or fewer steps and/or sub-steps. The methods or processes 300, 1400 may perform the steps and/or sub-steps simultaneously. The methods or processes 300, 1400 may perform the steps and/or sub-steps sequentially, including in the order provided or an order other than provided. Therefore, the above description should not be interpreted as a limitation on the scope of the present disclosure but merely an illustration.

In this regard, the present disclosure has a number of advantages over conventional systems and methods. Advantages of the present disclosure are directed to a system and method for optical wafer characterization with image up-sampling. Advantages of the present disclosure are also directed to improving a trade-off between throughput and sensitivity, by using a large pixel with up-sampling to create an equivalent small-pixel sensitivity. Advantages of the present disclosure are also directed to a spatial frequency filter or band limiting filter (BLF) usable to increase the signal-to-noise ratio (SNR) of optical images captured by a detector. Advantages of the present disclosure are also directed to anti-aliasing techniques.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The previous description is presented to enable one of ordinary skill in the art to make and use the invention as provided in the context of a particular application and its requirements. As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, or the like. Furthermore, the results may be stored "permanently," "semi-permanently," temporarily," or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, or the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, or the like). In those instances where a convention analogous to "at least one of A, B, or C, or the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, or the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B".

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system comprising:
a processing unit communicatively coupled to a detector array of an optical wafer characterization system, wherein the processing unit is configured to:
acquire one or more target images of a target location on a wafer from the detector array;
apply a de-noising filter to the one or more target images to reject spatial frequencies larger than a selected a selected threshold, wherein the selected threshold is dependent on the wavelength of characterization illumination;
determine one or more difference images from one or more reference images and the one or more target images following de-noising; and
up-sample the one or more difference images, via an algorithmic up-sampling process, to generate one or more up-sampled images, wherein one or more wafer defects are detectable in the one or more up-sampled images, wherein the algorithmic up-sampling process comprises an interpolation process;
pass the one or more up-sampled images through an anomaly detector, wherein the anomaly detector is configured to adjust or remove up-sampled image pixel values that exceed a set threshold.

2. The system of claim 1, wherein the processing unit is configured to:
acquire the one or more reference images from the detector array, wherein the one or more reference images are of a reference location proximate to the target location on the wafer.

3. The system of claim 1, wherein the processing unit is configured to:
determine one or more difference images from the one or more reference images and the one or more target images by subtracting the one or more reference images from the one or more target images.

4. The system of claim 3, wherein the de-noising filter is a spatial frequency filter configured to remove a portion of noise in at least the one or more target images acquired by the array detector and configured to reduce alteration of a noise-free image.

5. The system of claim 4, wherein the spatial frequency filter is a fast Fourier transform (FFT) filter, wherein the at least the one or more target images are Fourier transformed, multiplied by a function of spatial frequency, and inverse Fourier transformed by the FFT filter.

6. The system of claim 4, wherein the spatial frequency filter is a finite-impulse-response (FIR) filter, wherein the at least the one or more target images are convolved by the FIR filter.

7. The system of claim 1, wherein the processing unit is configured to:
apply the de-noising filter to the one or more reference images; and
determine the one or more difference images from the one or more reference images and the one or more target images after de-noising the one or more reference images and the one or more target images.

8. The system of claim 1, wherein the processing unit includes a field programmable gate array (FPGA), an application-specific integrated circuit, a graphical processing unit, or a central processing unit.

9. The system of claim 1, wherein the optical wafer characterization system is a broadband plasma (BBP) tool.

10. The system of claim 1, wherein the processing unit is configured to:
determine one or more control signals based on one or more wafer defects detected in the one or more up-sampled images, wherein the one or more control signals are configured to make one or more adjustments to at least one of one or more optical wafer characterization components of the optical wafer characterization system or one or more semiconductor fabrication components of a semiconductor fabrication system.

11. The system of claim 1, wherein the processing unit is communicatively coupled to a controller, wherein the controller includes one or more processors and memory, wherein the memory is configured to store program instructions, wherein the one or more processors are configured to execute the program instructions causing the one or more processors to:
receive the one or more up-sampled images from the processing unit; and
determine one or more control signals based on one or more wafer defects detected in the one or more up-sampled images, wherein the one or more control signals are configured to make one or more adjustments to at least one of one or more optical wafer characterization components of the optical wafer characterization system or one or more semiconductor fabrication components of a semiconductor fabrication system.

12. A method comprising:
acquiring, via a processing unit, one or more target images of a target location on a wafer from a detector array of an optical wafer characterization system;
applying, via the processing unit, a de-noising filter to the one or more target images to reject spatial frequencies larger than a selected a selected threshold, wherein the selected threshold is dependent on the wavelength of characterization illumination;
determining, via the processing unit, one or more difference images from one or more reference images and the one or more target images following de-noising; and
up-sampling, via the processing unit, the one or more difference images, via an algorithmic up-sampling process, to generate one or more up-sampled images, wherein one or more wafer defects are detectable in the one or more up-sampled images, wherein the algorithmic up-sampling process comprises an interpolation process; and passing, via the processing unit, the one or more up-sampled images through an anomaly detector, wherein the anomaly detector is configured to adjust or remove up-sampled image pixel values that exceed a set threshold.

13. The method of claim 12, further comprising:
acquiring, via the processing unit, the one or more reference images from the detector array, wherein the one or more reference images are of a reference location proximate to the target location on the wafer.

14. The method of claim 12, wherein the determining the one or more difference images from the one or more reference images and the one or more target images includes subtracting the one or more reference images from the one or more target images following de-noising.

15. The method of claim 12, wherein the de-noising filter is a spatial frequency filter configured to remove a portion of noise in at least the one or more target images acquired by the array detector and configured to reduce alteration of a noise-free image.

16. The method of claim 15, wherein the spatial frequency filter is a fast Fourier transform (FFT) filter, wherein the at least the one or more target images are Fourier transformed, multiplied by a function of spatial frequency, and inverse Fourier transformed by the FFT filter.

17. The method of claim 15, wherein the spatial frequency filter is a finite-impulse-response (FIR) filter, wherein the at least the one or more target images are convolved by the FIR filter.

18. The method of claim 14, further comprising:
applying the de-noising filter to the one or more reference images; and
determining the one or more difference images from the one or more reference images and the one or more target images after de-noising the one or more reference images and the one or more target images.

19. The method of claim 12, wherein the processing unit includes a field programmable gate array (FPGA), an application-specific integrated circuit, a graphical processing unit, or a central processing unit.

20. The method of claim 12, wherein the optical wafer characterization system is a broadband plasma (BBP) tool.

21. The method of claim 12, further comprising:
determining, via the processing unit, one or more control signals based on one or more wafer defects detected in the one or more up-sampled images, wherein the one or more control signals are configured to make one or more adjustments to at least one of one or more optical wafer characterization components of the optical wafer characterization system or one or more semiconductor fabrication components of a semiconductor fabrication system.

22. The method of claim 12, wherein the processing unit is communicatively coupled to a controller, wherein the method further comprises:
receiving, via the controller, the one or more up-sampled images from the processing unit; and
determining, via the controller, one or more control signals based on one or more wafer defects detected in the one or more up-sampled images, wherein the one or more control signals are configured to make one or more adjustments to at least one of one or more optical wafer characterization components of the optical wafer characterization system or one or more semiconductor fabrication components of a semiconductor fabrication system.

23. An optical wafer characterization system comprising:
a light source configured to generate and transmit light;
an illumination arm including one or more illumination optics configured to illuminate a wafer disposed on a stage assembly with the light received from the light source;
a collection arm including one or more collection optics;
a detector array including one or more sensors, wherein the one or more collection optics are configured to image the wafer onto the detector array; and
a processing unit communicatively coupled to the detector array, wherein the processing unit is configured to:
acquire one or more target images of a target location on the wafer from the detector array;
apply a de-noising filter to the one or more target images to reject spatial frequencies larger than a selected a selected threshold, wherein the selected threshold is dependent on the wavelength of inspection illumination;
determine one or more difference images from one or more reference images and the one or more target images following de-noising;
up-sample the one or more difference images, via an algorithmic up-sampling process, to generate one or more up-sampled images, wherein one or more wafer defects are detectable in the one or more up-sampled images, wherein the algorithmic up-sampling process comprises an interpolation process; and
pass the one or more up-sampled images through an anomaly detector, wherein the anomaly detector is configured to adjust or remove up-sampled image pixel values that exceed a set threshold.

24. The optical wafer characterization system of claim 23, wherein the processing unit is configured to:
acquire the one or more reference images from the detector array, wherein the one or more reference images are of a reference location proximate to the target location on the wafer.

25. The optical wafer characterization system of claim 23, wherein the processing unit is configured to:
determine one or more difference images from the one or more reference images and the one or more target images by subtracting the one or more reference images from the one or more target images following de-noising.

26. The optical wafer characterization system of claim 23, wherein the de-noising filter is a spatial frequency filter configured to remove a portion of noise in at least the one or more target images acquired by the array detector and configured to reduce alteration of a noise-free image.

27. The optical wafer characterization system of claim 26, wherein the spatial frequency filter is a fast Fourier transform (FFT) filter, wherein the at least the one or more target images are Fourier transformed, multiplied by a function of spatial frequency, and inverse Fourier transformed by the FFT filter.

28. The optical wafer characterization system of claim 26, wherein the spatial frequency filter is a finite-impulse-response (FIR) filter, wherein the at least the one or more target images are convolved by the FIR filter.

29. The optical wafer characterization system of claim 25, wherein the processing unit is configured to:

apply the de-noising filter to the one or more reference images; and determine the one or more difference images from the one or more reference images and the one or more target images after de-noising the one or more reference images and the one or more target images.

30. The optical wafer characterization system of claim 23, wherein the processing unit includes a field programmable gate array (FPGA), an application-specific integrated circuit, a graphical processing unit, or a central processing unit.

31. The optical wafer characterization system of claim 23, wherein the optical wafer characterization system is a broadband plasma (BBP) tool including a laser-pumped plasma light source.

32. The optical wafer characterization system of claim 23, wherein the processing unit is configured to:

determine one or more control signals based on one or more wafer defects detected in the one or more up-sampled images, wherein the one or more control signals are configured to make one or more adjustments to at least one of one or more optical wafer characterization components of the optical wafer characterization system or one or more semiconductor fabrication components of a semiconductor fabrication system.

33. The optical wafer characterization system of claim 23, wherein the optical wafer characterization system further comprises:

a controller communicatively coupled to the processing unit, wherein the controller includes one or more processors and memory, wherein the memory is configured to store program instructions, wherein the one or more processors are configured to execute the program instructions causing the one or more processors to:

receive the one or more up-sampled images from the processing unit; and determine one or more control signals based on one or more wafer defects detected in the one or more up-sampled images, wherein the one or more control signals are configured to make one or more adjustments to at least one of one or more optical wafer characterization components of the optical wafer characterization system or one or more semiconductor fabrication components of a semiconductor fabrication system.

34. A system comprising:

a processing unit communicatively coupled to a detector array of an optical wafer characterization system, wherein the processing unit is configured to:

acquire one or more target images of a target location on a wafer from the detector array;

apply a de-noising filter to at least the one or more target images; and determine one or more difference images from one or more reference images and the one or more target images after de-noising at least the one or more target images;

up-sample the one or more difference images, via an algorithmic up-sampling process, to generate one or more up-sampled images, wherein one or more wafer defects are detectable in the one or more up-sampled images, wherein the algorithmic up-sampling process comprises an interpolation process; and pass the one or more up-sampled images through an anomaly detector, wherein the anomaly detector is configured to adjust or remove up-sampled image pixel values that exceed a set threshold.

35. The system of claim 34, wherein the processing unit is configured to:

acquire the one or more reference images from the detector array, wherein the one or more reference images are of a reference location proximate to the target location on the wafer.

36. The system of claim 34, wherein the processing unit is configured to:

determine the one or more difference images from the one or more reference images and the one or more target images by subtracting the one or more reference images from the one or more target images.

37. The system of claim 34, wherein the de-noising filter is a spatial frequency filter configured to remove a portion of noise in at least the one or more target images acquired by the array detector and configured to reduce alteration of a noise-free image.

38. The system of claim 37, wherein the spatial frequency filter is a fast Fourier transform (FFT) filter, wherein the at least the one or more target images are Fourier transformed, multiplied by a function of spatial frequency, and inverse Fourier transformed by the FFT filter.

39. The system of claim 37, wherein the spatial frequency filter is a finite-impulse-response (FIR) filter, wherein the at least the one or more target images are convolved by the FIR filter.

40. The system of claim 34, wherein the processing unit is configured to:

apply a de-noising filter to the one or more reference images; and determine the one or more difference images from the one or more reference images and the one or more target images after de-noising the one or more reference images and the one or more target images.

41. The system of claim 34, wherein the processing unit includes a field programmable gate array (FPGA), an application-specific integrated circuit, a graphical processing unit, or a central processing unit.

42. The system of claim 34, wherein the optical wafer characterization system is a broadband plasma (BBP) tool.

43. The system of claim 34, wherein the processing unit is configured to:

determine one or more control signals based on one or more wafer defects detected in the difference images, wherein the one or more control signals are configured to make one or more adjustments to at least one of one or more optical wafer characterization components of the optical wafer characterization system or one or more semiconductor fabrication components of a semiconductor fabrication system.

44. The system of claim 34, wherein the processing unit is communicatively coupled to a controller, wherein the controller includes one or more processors and memory, wherein the memory is configured to store program instructions, wherein the one or more processors are configured to execute the program instructions causing the one or more processors to:

receive the one or more difference images from the processing unit; and determine one or more control signals based on one or more wafer defects detected in the one or more difference images, wherein the one or more control signals are configured to make one or more adjustments to at least one of one or more optical wafer characterization components of the optical wafer characterization system or one or more semiconductor fabrication components of a semiconductor fabrication system.

45. A method comprising:
- acquiring, via a processing unit, one or more target images of a target location on a wafer from a detector array of an optical wafer characterization system;
- applying, via the processing unit, a de-noising filter to at least the one or more target images; and
- determining, via the processing unit, one or more difference images from one or more reference images and the one or more target images after de-noising at least the one or more target images, wherein one or more wafer defects are detectable in the one or more difference images;
- up-sampling the one or more difference images, via an algorithmic up-sampling process, to generate one or more up-sampled images, wherein one or more wafer defects are detectable in the one or more up-sampled images, wherein the algorithmic up-sampling process comprises an interpolation process; and
- pass the one or more up-sampled images through an anomaly detector, wherein the anomaly detector is configured to adjust or remove up-sampled image pixel values that exceed a set threshold.

46. The method of claim 45, further comprising:
- acquiring, via the processing unit, the one or more reference images from the detector array, wherein the one or more reference images are of a reference location proximate to the target location on the wafer.

47. The method of claim 45, further comprising:
- determining, via the processing unit, the one or more difference images from the one or more reference images and the one or more target images by subtracting the one or more reference images from the one or more target images.

48. The method of claim 45, wherein the de-noising filter is a spatial frequency filter configured to remove a portion of noise in at least the one or more target images acquired by the detector array and configured to reduce alteration of a noise-free image.

49. The method of claim 48, wherein the spatial frequency filter is a fast Fourier transform (FFT) filter, wherein the at least the one or more target images are Fourier transformed, multiplied by a function of spatial frequency, and inverse Fourier transformed by the FFT filter.

50. The method of claim 48, wherein the spatial frequency filter is a finite-impulse-response (FIR) filter, wherein the at least the one or more target images are convolved by the FIR filter.

51. The method of claim 45, further comprising:
- applying, via the processing unit, a de-noising filter to the one or more reference images; and
- determining, via the processing unit, the one or more difference images from the one or more reference images and the one or more target images after de-noising the one or more reference images and the one or more target images.

52. The method of claim 45, wherein the processing unit includes a field programmable gate array (FPGA), an application-specific integrated circuit, a graphical processing unit, or a central processing unit.

53. The method of claim 45, wherein the optical wafer characterization system is a broadband plasma (BBP) tool.

54. The method of claim 45, further comprising:
- determining, via the processing unit, one or more control signals based on one or more wafer defects detected in the difference images, wherein the one or more control signals are configured to make one or more adjustments to at least one of one or more optical wafer characterization components of the optical wafer characterization system or one or more semiconductor fabrication components of a semiconductor fabrication system.

55. The method of claim 45, wherein the processing unit is communicatively coupled to a controller, wherein the method further comprises:
- receiving, via the controller, the one or more difference images from the processing unit; and
- determining, via the controller, one or more control signals based on one or more wafer defects detected in the one or more difference images, wherein the one or more control signals are configured to make one or more adjustments to at least one of one or more optical wafer characterization components of the optical wafer characterization system or one or more semiconductor fabrication components of a semiconductor fabrication system.

56. An optical wafer characterization system comprising:
- a light source configured to generate and transmit light;
- an illumination arm including one or more illumination optics configured to illuminate a wafer disposed on a stage assembly with the light received from the light source;
- a collection arm including one or more collection optics;
- a detector array including one or more sensors, wherein the one or more collection optics are configured to image the wafer onto the detector array; and
- a processing unit communicatively coupled to the detector array, wherein the processing unit is configured to:
  - acquire one or more target images of a target location on a wafer from the detector array;
  - apply a de-noising filter to at least the one or more target images; and
  - determine one or more difference images from one or more reference images and the one or more target images after de-noising at least the one or more target images, wherein one or more wafer defects are detectable in the one or more difference images;
  - up-sample the one or more difference images, via an algorithmic up-sampling process, to generate one or more up-sampled images, wherein one or more wafer defects are detectable in the one or more up-sampled images, wherein the algorithmic up-sampling process comprises an interpolation process; and
  - pass the one or more up-sampled images through an anomaly detector, wherein the anomaly detector is configured to adjust or remove up-sampled image pixel values that exceed a set threshold.

57. The optical wafer characterization system of claim 56, wherein the processing unit is configured to:
- acquire the one or more reference images from the detector array, wherein the one or more reference images are of a reference location proximate to the target location on the wafer.

58. The optical wafer characterization system of claim 56, wherein the processing unit is configured to:
- determine the one or more difference images from the one or more reference images and the one or more target images by subtracting the one or more reference images from the one or more target images.

59. The optical wafer characterization system of claim 56, wherein the de-noising filter is a spatial frequency filter configured to remove a portion of noise in at least the one or more target images acquired by the array detector and configured to reduce alteration of a noise-free image.

60. The optical wafer characterization system of claim 59, wherein the spatial frequency filter is a fast Fourier transform (FFT) filter, wherein the at least the one or more target images are Fourier transformed, multiplied by a function of spatial frequency, and inverse Fourier transformed by the FFT filter.

61. The optical wafer characterization system of claim 59, wherein the spatial frequency filter is a finite-impulse-response (FIR) filter, wherein the at least the one or more target images are convolved by the FIR filter.

62. The optical wafer characterization system of claim 56, wherein the processing unit is configured to:
apply a de-noising filter to the one or more reference images; and
determine the one or more difference images from the one or more reference images and the one or more target images after de-noising the one or more reference images and the one or more target images.

63. The optical wafer characterization system of claim 56, wherein the processing unit includes a field programmable gate array (FPGA), an application-specific integrated circuit, a graphical processing unit, or a central processing unit.

64. The optical wafer characterization system of claim 56, wherein the optical wafer characterization system is a broadband plasma (BBP) tool.

65. The optical wafer characterization system of claim 56, wherein the processing unit is configured to:
determine one or more control signals based on one or more wafer defects detected in the difference images, wherein the one or more control signals are configured to make one or more adjustments to at least one of one or more optical wafer characterization components of the optical wafer characterization system or one or more semiconductor fabrication components of a semiconductor fabrication system.

66. The optical wafer characterization system of claim 56, wherein the optical wafer characterization system further comprises:
a controller communicatively coupled to the processing unit, wherein the controller includes one or more processors and memory, wherein the memory is configured to store program instructions, wherein the one or more processors are configured to execute the program instructions causing the one or more processors to:
receive the one or more difference images from the processing unit; and
determine one or more control signals based on one or more wafer defects detected in the one or more difference images, wherein the one or more control signals are configured to make one or more adjustments to at least one of one or more optical wafer characterization components of the optical wafer characterization system or one or more semiconductor fabrication components of a semiconductor fabrication system.

* * * * *